(12) United States Patent
Nakajima et al.

(10) Patent No.: US 7,150,905 B2
(45) Date of Patent: Dec. 19, 2006

(54) INTERLAYER FOR LAMINATED GLASS AND LAMINATED GLASS

(75) Inventors: Minoru Nakajima, Shiga (JP); Isei Sannomiya, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 11/216,125

(22) Filed: Sep. 1, 2005

(65) Prior Publication Data

US 2005/0287341 A1    Dec. 29, 2005

Related U.S. Application Data

(62) Division of application No. 10/786,367, filed on Feb. 26, 2004, which is a division of application No. 10/019,656, filed on Feb. 12, 2002, now Pat. No. 6,863,956.

(30) Foreign Application Priority Data

| Jul. 1, 1999 | (JP) | ................... 11/187627 |
| Jul. 15, 1999 | (JP) | ................... 11/201747 |
| Aug. 2, 1999 | (JP) | ................... 11/218796 |
| Dec. 1, 1999 | (JP) | ................... 11/342172 |
| Dec. 7, 1999 | (JP) | ................... 11/347675 |
| Jan. 6, 2000 | (JP) | ...................... 2000/900 |
| Jan. 13, 2000 | (JP) | .................... 2000/4685 |
| Feb. 3, 2000 | (JP) | .................... 2000/26652 |

(51) Int. Cl.
*B32B 3/00* (2006.01)
*B32B 3/28* (2006.01)
*B32B 17/00* (2006.01)

(52) U.S. Cl. .................. 428/156; 428/167; 428/437

(58) Field of Classification Search ............. 428/141, 428/156, 167, 172, 212, 425.6, 437

See application file for complete search history.

(56) References Cited

U.S. PATENT DOCUMENTS

| 3,911,187 A | 10/1975 | Raley |
| 4,035,549 A | 7/1977 | Kennar |
| 4,135,023 A | 1/1979 | Lloyd et al. |
| 4,455,337 A * | 6/1984 | Lloyd et al. ................. 428/134 |
| 4,925,725 A | 5/1990 | Endo et al. |

(Continued)

FOREIGN PATENT DOCUMENTS

EP        0 215 976 A1    4/1987

(Continued)

OTHER PUBLICATIONS

European Search Report dated Mar. 19, 2004.

*Primary Examiner*—Donald J. Loney
(74) *Attorney, Agent, or Firm*—Mion, PLLC

(57) ABSTRACT

The present invention provides an interlayer for a laminated glass which does not give rise to the moiré phenomenon even when the arrangement and pitch of its embossments are orderly, hence providing for good workability in cutting and laminationg operations and good deaeration in preliminary contact bonding, thus insuring the production of a laminated glass of high quality with a minimum of rejects for reasons of air bubbles, and a laminated glass containing said interlayer. The invention also provides an interlayer for a laminated glass which provides for good deaeration without a risk for premature margial sealing even if the temperature at initiation of deaeration at preliminary contact bonding is not critically controlled and which does not require raising of temperature for achieving a marginal seal of the glass-interlayer assembly, and a laminated glass containing said interlayer.

7 Claims, 10 Drawing Sheets

U.S. PATENT DOCUMENTS

| | | |
|---|---|---|
| 5,091,258 A | 2/1992 | Moran |
| 5,425,977 A | 6/1995 | Hopfe |
| 5,455,103 A | 10/1995 | Hoagland et al. |
| 6,093,471 A | 7/2000 | Hopfe et al. |

FOREIGN PATENT DOCUMENTS

| | | |
|---|---|---|
| EP | 0 390 578 A2 | 10/1990 |
| EP | 0 710 545 A1 | 5/1996 |
| JP | 59-39748 | 3/1984 |
| JP | 1-032776 A | 2/1989 |
| JP | 5-294679 A | 11/1993 |
| JP | 6-127983 | 5/1994 |
| JP | 6-198809 | 7/1994 |
| JP | HEI-6-198809 | 7/1994 |
| JP | 95/19885 | 7/1995 |
| JP | 9-508078 A | 8/1997 |
| JP | 9-295839 | 11/1997 |
| JP | HEI-9-295839 | 11/1997 |
| JP | 0 826 722 A2 | 3/1998 |
| JP | 11-147735 | 6/1999 |
| JP | 2000-7390 | 1/2000 |
| JP | 2000-256043 | 9/2000 |
| JP | 2000-256044 | 9/2000 |
| WO | WO 95/19885 | 7/1995 |

* cited by examiner

Face side

Reverse side

Cross-section

Face side

Reverse side

Cross-section

Face side

Reverse side

Cross-section

Face side

Reverse side

Cross-section

Face side

Reverse side

Cross-section

Face side

Reverse side

Cross-section

INTERLAYER FOR LAMINATED GLASS AND LAMINATED GLASS

This is a divisional of application Ser. No. 10/786,367 filed Feb. 26, 2004; which is a divisional of Ser. No. 10/019,656 filed Feb. 12, 2002 now U.S. Pat. No. 6,863,956; which is a §371 National Stage Application of PCT Application No. PCT/JP00/04383 filed Jul. 3, 2000, now U.S. Pat. No. 6,863,956; the disclosure of which is incorporated herein by reference.

TECHNICAL FIELD

The present invention relates to an interlayer for a laminated glass providing for improved deaeration and a laminated glass comprising the same.

BACKGROUND ART

The laminated glass manufactured by interposing an interlayer comprising a sheet made of a thermoplastic resin such as plasticized polyvinyl butyral between glass sheets and bonding them together into an integral unit is in broad use for glazing the windows of automobiles, aircraft, and buildings.

When such a laminated glass is subjected to an external impact, the glass may break up but the interlayer sandwiched between the component glass sheets will not readily be destroyed and even after breakage, the glass remains glued to the interlayer so that its fragments will not be scattered. Therefore, the bodies of men in the vehicle or building are protected against the injury by fragments of the broken glass.

Such a laminated glass is usually manufactured by interposing an interlayer between glass sheets, drawing the whole over a nip roll or placing it in a rubber bag and evacuating the bag to effect preliminary contact bonding with concurrent removal of the residual air entrapped between the glass and the interlayer under suction, and finally carrying out final contact bonding at elevated temperature and pressure in an autoclave.

The interlayer mentioned above is required to satisfy not only the basic performance requirements such as good clarity, bond ability, bullet resistance, weather resistance, etc. but also the requirement that it does not undergo blocking during storage, the requirement that it provides for good workability in the insertion thereof between glass sheets, and the requirement that it lends itself to efficient deaeration in preliminary contact bonding so that the formation of bubbles by entrapment of air may be precluded.

To satisfy the above requirements, it is common practice to provide both surfaces of an interlayer with many embossment patterns comprising fine convex portions and concave portions. As the geometry of such concave and convex portions, there are disclosed a variety of embossment geometries each containing a multiplicity of concave portions and the corresponding multiplicity of concave portions, and a variety of geometries each containing a multiplicity of ridges and the corresponding multiplicity of troughs.

The morphological parameters of an embossment design, such as coarseness, arrangement and relative size, have also been explored and Japanese Kokoku Publication Hei-1-32776 discloses "a thermoplastic resin interlayer comprising a flexible thermoplastic resin film or sheet having a fine concavo-convex (embossed) surface pattern for use as an interlayer for lamination characterized in that at least one side of which is provided with a multiplicity of discrete protruded portions integral with the film or sheet, with all the concave portions complementary to said protruded portions forming a continuum on the same level."

However, when such an orderly embossment pattern is generally formed on both sides of the interlayer, the mutual interference of the diffracting surfaces gives rise to a streaks-like diffraction image known generally as the "moiré phenomenon".

Furthermore, since the conventional embossment pattern is generally provided in a random fashion by using sand blasted roll, it hardly provides for sufficient deaeration.

The moiré phenomenon mentioned above is not only undesirable from appearance points of view but the attention-distracting change of the interference fringes causes an eye strain and motion sickness-like symptoms in the working personnel involved in interlayer cutting and laminating operations, thus leading to the problem of poor workability. Moreover, even in the case of an interlayer provided with an orderly embossment pattern only on one side, the operation involving the stacking of a plurality of interlayer sheets causes appearance of the moiré phenomenon, thus detracting from workability in a similar manner.

The moiré phenomenon is more liable to occur when the arrangement and pitch of the embossed pattern formed on the surface of an interlayer are more orderly, and in cases where the arrangement is such that the distance between at least two points of the convex portions of respective embossments is constant or where the arrangement of the embossment-pattern on both sides of the interlayer are identical, the moiré phenomenon occurs in most instances.

Therefore, such embossment patterns as a grid pattern, a stripe pattern, and a radiant pattern having a constant angular pitch may be mentioned as representative embossment patterns liable to give rise to the moiré phenomenon.

To overcome this disadvantage of the above moiré phenomenon and the associated deterioration of workability, Japanese Kokai Publication Hei-5-294679, for instance, discloses "a method which comprises providing the surface of an interlayer with a multiplicity of protruded portions in a controlled pattern and further with an embossment pattern of convex portions finer than these protruded portions in a random pattern."

It is true that the above method contributes in a considerable measure to attenuation of the above moiré phenomenon but since the embossment pattern of finer convex portions is formed to extend not only to surfaces of the larger protruded portions but also surfaces not formed with the larger protruded portions, the pooling of air occurs in concave portions of the embossment between the finer convex portions so that the deaeration in preliminary contact bonding becomes insufficient as a disadvantage.

Further, Japanese Kohyo Publication Hei-9-508078 discloses an interlayer having embossment patterns each having an orderly array of troughs, the pattern on one side being displaced from that on the other side by not less than 25 degrees, more preferably by 90 degrees, to thereby obviate the moiré phenomenon.

It is known, in the above technology, that the linear designs displaced by 90 degrees for obviating the moiré phenomenon can be imparted by the heat transfer technique using a roll having engraved lines of 45 degrees. However, the larger the angle of engraved lines of the roll is, the less easy is the heat transfer to be effected. Generally speaking, a pattern of longitudinally parallel lines with respect to the flow of transfer can be most easily formed and a pattern of transverse lines requires transfer temperature control as well as a high transfer pressure.

Furthermore, in the above technology, unless the temperature at initiation of deaeration in preliminary contact bonding is critically controlled, a premature sealing of the marginal part of the glass-interlayer assembly (e.g. glass/interlayer/glass), i.e. premature marginal sealing, takes place, with the result that the deaeration of the central part of the assembly becomes still more inadequate.

As a measure to prevent the above premature marginal sealing, there is known the method which comprises controlling the temperature at initiation of deaeration according to the size of troughs to thereby prevent said premature sealing at the pressure bonding of the assembly or the method which comprises increasing the coarseness of embossment. However, there is the problem that in order to achieve a positive marginal seal of the laminate, the temperature for preliminary contact bonding must be considerably raised.

Furthermore, if the linear designs on both sides of the interlayer are made parallel from moldability considerations, the problem will arise that the handleability of the interlayer particularly in terms of self-adhesiveness is adversely affected, i.e. the self-adhesion of the interlayer is increased.

In fact, the above prior art interlayer has been fairly improved in the tendency toward blocking during storage, handling workability, and the efficiency of deaeration in preliminary contact bonding but in the production of a laminated glass having a large surface area or a laminated glass with a large radius of curvature or in carrying out deaeration under the stringent conditions imposed by circumstances calling for increased productivity of laminated glass, for instance, there is the problem that the deaeration and sealing effects are not so satisfactory as desired.

Thus, when deaeration is to be carried out under such stringent conditions, it is difficult, in particular, to establish a uniform seal between the sheet glass and interlayer all over the area and, hence, deaeration and sealing become insufficient, with the result that in the final contact bonding performed under heat and pressure in an autoclave, pressurized air infiltrates through the seal defect to form air bubbles between the glass and the interlayer, thus frustrating to produce a laminated glass of high transparency.

The problem of such a seal defect can be resolved to a certain extent by strictly controlling preliminary contact bonding conditions within a certain very narrow range but the compatible temperature range is so narrow that the incidence of rejects due to air bubble formation is increased.

Moreover, when a laminated glass is manufactured using an interlayer such that both the geometry of embosses and the level of depressions are uniform all over as described in the above disclosure, the variation in thickness of the very interlayer film and the pair thickness difference consisting of the difference in thickness or the difference in the radius of curvature of the glass to be laminated cannot be sufficiently absorbed.

In addition, in the case of the prior art interlayer, it is necessary to prepare a large number of embossing rolls having different designs corresponding to various processing needs of users and manufacture many kinds of interlayer films embossed to various three-dimensional patterns compatible with the respective users' processing conditions, this being inefficient from productivity points of view.

Furthermore, when the preliminary contact bonding process involving deaeration by draw deaeration is compared with the process involving deaeration by vacuum deaeration, there is a marked difference in the conditions of deaeration, viz. whereas deaeration is effected at an elevated pressure in the former process, it is effected at a negative pressure in the latter process, so that in establishments having only one kind of equipment, there are cases in which preliminary contact bonding cannot be carried out.

As mentioned hereinbefore, the preliminary contact bonding technology involving deaeration is generally classified into a draw deaeration method in which the glass-interlayer assembly is drawn over a rubber roll and a vacuum deaeration method in which the assembly is placed in a rubber bag and subjected to a negative pressure to bleed air from the margin of the glass-interlayer assembly.

In the deaeration method involving the use of a negative pressure, the process starts with placing the glass/interlayer/glass assembly in a sufficiently cooled (e.g. 20° C.) rubber bag and starting deaeration. The vacuum hold time is set to about 10 minutes and after the air is sufficiently removed from the whole glass/interlayer/glass assembly, the temperature is raised to heat the assembly to about 110° C. By this procedure, the interlayer and glass are bonded almost completely tight. Then, the assembly is cooled to the neighborhood of room temperature and the preliminary laminated glass thus obtained is taken out and transferred to the final contact bonding stage.

When the vacuum deaeration method is adopted in the preliminary contact bonding stage, which comprises the above cycle of heating and cooling, it is necessary for enhanced productivity to set the initial temperature within the rubber bag at a high level and set the ultimate temperature at a low level.

However, when the initial temperature within the rubber bag is set high, the marginal part of the assembly is the first to succumb to the pressure of contact bonding so that the air in the central part is prevented from escaping efficiently but remains entrapped. If the deaeration is sufficient in the preliminary contact bonding stage, any residual air, which is small in amount, is allowed to dissolve in the interlayer in the final contact bonding stage (e.g. 130° C.×1.3 MPa×1 hr), with the result that a transparent laminated glass can be obtained. However, if the residual amount of air is large, the air will not be completely dissolved in the final contact bonding stage so that air bubbles appear in the product laminated glass. On the other hand, if the ultimate temperature is set too low, an incomplete seal occurs locally in the marginal region and as the pressurized air finds its way into such localities in the final contact bonding stage, air bubbles are produced in the product laminate.

Another factor contributory to the above phenomenon is that, in a laminated glass of the glass/interlayer/glass construction, there occur areas where one of the glass sheets is urged toward the other glass sheet and areas where one of the glass sheets is urged away from the other glass sheet depending on the accuracy of glass bending and the way in which the gravity of glass acts.

The geometry of embossed surface irregularities proposed so far includes random geometries (a hill and a valley are alternating) and orderly geometries comprising quadrangular pyramids or triangular pyramids. In addition, as applicable to the vacuum deaeration method, Japanese Kohyo Publication Hei-9-508078 teaches that providing a route for escape of air by means of troughs is effective in preventing the premature sealing in the course of deaeration.

This method, however, has the disadvantage that while the initial temperature within the rubber bag can be set high, the ultimate temperature must also be set high and if the ultimate temperature is set low, the infiltration of air will occur in the final contact bonding stage to cause air bubbles. Thus, in the case of the conventional random embossments, the heating may be carried out simply from an initial temperature of 20°

C. to an ultimate temperature of 85° C. In the method referred to above, however, the formation of air bubbles cannot be avoided unless the heating is performed from an initial temperature of 35° C. to an ultimate temperature of 95° C. so that even if the depth (height), width, and pitch of troughs or ridges are optimized, the embossments must be collapsed to a certain volume. Consequently, the initial temperature and the ultimate temperature must be shifted upward almost in parallel, with the result that the effect of increasing the productivity of preliminary contact bonding, which is a deaeration process, is small.

SUMMARY OF INVENTION

In the above state of the art, the present invention has for its object to provide an interlayer for a laminated glass which does not give rise to the moiré phenomenon even when the arrangement and pitch of its embossments are orderly, hence providing for good workability in cutting and laminating operations and good deaeration in preliminary contact bonding, thus insuring the production of a laminated glass of high quality with a minimum of rejects for reasons of air bubbles, and a laminated glass containing said interlayer.

The invention has for its further object to provide an interlayer for a laminated glass which provides for good deaeration without a risk for premature marginal sealing even if the temperature at initiation of deaeration at preliminary contact bonding is not critically controlled and which does not require raising of temperature for achieving a marginal seal of the glass-interlayer assembly, and a laminated glass containing said interlayer.

The present invention has for its still further object to provide an interlayer for a laminated glass which is satisfactory in the resistance to blocking during storage, handling work ability and productivity in the processing of glass, as well as deaeration and sealing properties at preliminary contact bonding and which is capable of adapting itself with ease and efficiently to varied processing needs of various users, and a laminated glass containing said interlayer.

The present invention is directed to an interlayer for a laminated glass which comprises a thermoplastic resin sheet provided with embossments comprising concave portions and convex portions on both sides thereof (hereinafter referred to sometimes as "interlayer").

The first aspect of the present invention is concerned with an interlayer for a laminated glass in which a pitch of embossments on one side is different from a pitch of embossments on the other side.

In accordance with the first aspect of the invention, it is preferable that concave portions on at least one side are continual and it is more preferable that bottoms of concave portions on at least one side are continual.

In this first aspect of the invention, it is preferable that the pitch (L1) of embossments on one side and the pitch (L2) of embossments on the other side satisfy the relation of (L1)<(L2), and the proportion of existence of a convex portion on the other side within the range (L1×0.25) of before and after a position of a convex portion on one side is not more than 50% of the number of convex portions on one side.

In the first aspect of the invention, it is further preferable that concave portions on at least one side are provided in a linear pattern.

The second aspect of the present invention is an interlayer for a laminated glass in which said concave portions on at least one side have a trough-like geometry with a continual bottom while said convex portion on the same side has a plateau-forming top.

In the second aspect of the present invention, it is preferable that fine concave and convex portions are provided on the plateau-forming top surface of the convex portion.

In the second aspect of the invention, a surface roughness Ra of the plateau-forming top surface is preferably not less than 2.5 µm, more preferably not less than 3.0 µm.

In the second aspect of the invention, a width of the plateau-forming top surface is preferably not less than 20% of a pitch of convex portions.

In the second aspect of the invention, the width of the plateau-forming top surface may be constant or random.

The third aspect of the present invention is concerned with an interlayer for a laminated glass in which said concave portions on at least one side have a trough-like geometry, and segmenting walls are formed within said trough-like geometry.

In the third aspect of the invention, a height of the segmenting wall is preferably smaller than a depth of the trough.

In the third aspect of the invention, the segmenting walls are preferably arranged at equal intervals.

The fourth aspect of the present invention is an interlayer for a laminated glass in which said concave portions on at least one side have a trough-like geometry and are not on one and the same level, and a ratio of a surface roughness (Rz) and a surface roughness (Rzv) of a negative model is Rzv/Rz≧0.25 on at least one side.

In the fourth aspect of the invention, troughs may be provided in a linear configuration or a grid configuration.

The fifth aspect of the present invention is concerned with an interlayer for a laminated glass in which said concave portions on at least one side have a continual trough-like geometry, and said convex portion on the same side has segmenting troughs while a bottom of said segmenting trough is not on one and the same level as a bottom of the continual trough-like geometry of said concave portion.

In the firth aspect of the invention, the trough-like geometry of the concave portion and segmenting troughs of said convex portion may be provided in a grid configuration or a in random configuration.

In the fifth aspect of the invention, a depth of segmenting troughs of the convex portion may be uniform or random.

The sixth aspect of the present invention is concerned with an interlayer for a laminated glass in which at least one side is provided with concave troughs, and an angle between said concave trough and a direction of extrusion of said thermoplastic resin sheet is less than 25°.

The seventh aspect of the present invention is concerned with an interlayer for a laminated glass in which said concave portions on at least one side have a trough-like geometry, and said trough-like geometry is constant in sectional area while has a depth distribution of troughs having a depth of not less than 5% of the maximum trough depth.

In the seventh aspect of the invention, troughs having the depth of not less than 5% of the maximum trough depth are preferably provided at a pitch of not more than 10 mm.

In the seventh aspect of the invention, the trough-like geometry is preferably provided in parallel with the direction of flow of the interlayer for a laminated glass.

In the present invention, the thermoplastic resin sheet is preferably a plasticized polyvinyl acetal resin sheet.

A laminated glass obtainable by interposing the interlayer for a laminated glass according to the invention between at least one pair of glass sheets and consolidating them into an integral unit also constitutes one aspect of the invention.

BRIEF DESCRIPTION OF THE DRAWINGS

Referring to FIG. 7 to FIG. 13, a represents the pitch of convex portions, b represents the width of the plateau-forming top surface of the convex portion, and c represents the width of the concave portion.

Referring to FIG. 18 and FIG. 19, 1 represents the trough-like configuration of the concave portion, 2-represents the segmenting troughs of the convex portion, and 3 represents the depth of segmenting troughs of the convex portion.

Referring to FIG. 20, 4 represents a concave trough and 5 represents an embossment.

DETAILED DESCRIPTION OF THE INVENTION

Figure 1:
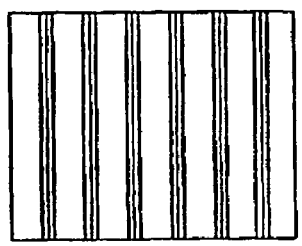
FIG. 1 is a schematic diagram illustrating the embossment pattern of the interlayer for a laminated glass according to Examples 1 to 3.
Figure 1:
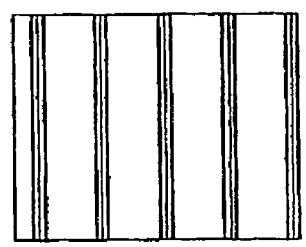
Figure 1:

The present invention is now described in detail.

The interlayer of the invention comprises a thermoplastic resin sheet.

As the thermoplastic resin sheet to be used in the invention, any of the known sheets available for use as laminated glass interlayers can be utilized; thus, for example, plasticized polyvinyl acetal resin sheet, polyurethane resin sheet, ethylene-vinyl acetate resin sheet, ethylene-ethyl acrylate resin sheet, and plasticized vinyl chloride resin sheet can be mentioned. While these thermoplastic resin sheets are quite satisfactory in the basic properties required of a laminated glass interlayer, such as adhesion, weather resistance, bullet resistance, transparency, etc., the plasticized polyvinyl acetal resin sheet represented by plasticized polyvinyl butyral resin sheet can be used with particular advantage.

The plasticized polyvinyl acetal resin mentioned above is preferably a resin composition predominantly composed of polyvinyl acetal resin and as the polyvinyl acetal resin, a polyvinyl butyral resin having a butyralization degree of 60 to 70 mol % and a polymerization degree of 1000 to 2000, for instance, can be used with advantage.

The plasticizer which can be used for said plasticized polyvinyl acetal resin sheet includes ethylene glycol di-2-ethyl butyrate, 1,3-propylene glycol di-2-ethylbutyrate, 1,4-propylene glycol di-2-ethylbutyrate, 1,4-butylene glycol di-2-ethylbutyrate, 1,2-butylene glycol di-2-ethylbutyrate, diethylene glycol di-2-ethylbutyrate, diethylene glycol di-2-ethylhexoate, dipropylene glycol di-2-ethylbutyrate, triethylene gycol di-2-ethylpentoate, triethylene glycol di-2-ethylhexoate, tetraethylene glycol di-2-ethylbutyrate, diethylene glycol dicaprylate, and triethylene glycol dicaprylate.

In the present invention, the addition level of such plasticizer is preferably within the range of 20 to 60 parts by weight per 100 parts by weight of polyvinyl acetal resin.

Furthermore, where necessary, the interlayer according to the invention may contain various additives such as heat stabilizer, ultraviolet absorber, adhesion modulating agent, and so forth.

The thickness of said thermoplastic resin sheet can be selected accordingly in consideration of the bullet resistance and other properties required of laminated glass and is not particularly restricted but, just as it is the case with the conventional interlayer, the preferred thickness is 0.2 to 2 mm.

For use as the interlayer according to the invention, said thermoplastic resin sheet is provided with embossments comprising concave portions and convex portions on both sides.

Unless the parameters specific to the respective aspects of the invention are dissatisfied, the above embossment pattern is not particularly restricted but encompasses a variety of concave and convex patterns having multiplicities of convex portions and complementary concave portions. The distribution of such convex and concave patterns may be orderly or random, although an orderly distribution is preferred.

The above convex portions may be equal or varying in height and the corresponding concave portions may also be equal or varying in depth.

Unless the parameters specific to the respective aspects of the invention are dissatisfied, the geometry of the above convex portion is not particularly restricted but includes various cones inclusive of triangular pyramid, quadrangular pyramid, circular cone, etc.; truncated cones such as truncated triangular pyramid, truncated quadrangular pyramid, truncated circular cone, etc.; and pseudocones having a hill or hemispherical head. The geometry of the above concave portion is complementary to that of said convex portion.

The technology of forming the embossment includes the embossing roll method, calender roll method, contour extrusion method, and extrusion-lip embossing method which takes advantage of melt fracture, among others. Particularly preferred among them is the embossing roll method by which an embossment quantitatively comprising constant and fine concave and convex portions can be produced.

The embossing roll for use in the above embossing roll method includes the one manufactured by subjecting the surface of a metal roll to blasting with grits of aluminum oxide, silicon lo oxide or the like and, then, to lapping with a vertical grinder or the like to reduce excessive surface peaks to thereby form a fine embossment pattern (concave and convex patterns) on the roll surface, the one obtained by using an engraving mill (mother mill) and transferring the embossment pattern (concave and convex patterns) of this engraving mill to the surface of a metal roll to produce a fine embossment pattern (concave and convex patterns) on the roll surface, and the one obtained by forming a fine embossing pattern (concave and convex patterns) on the surface of a roll by etching, among other methods.

Referring to the geometry of said embossment, the ease of release of air in deaeration at the preliminary contact bonding between the glass sheet and the interlayer is related to the continuity of the concave portions of the concavo-convex configuration, and the pitch and arrangement of concave portions have no important bearing on the ease of escape of air. In the early phase of deaeration, the air in the concave portion of the concavo-convex configuration flows from the interface with the glass selectively into the trough comprised of the concave portions. Then, the air in the trough is forced out via the trough and the amount of air that remains in the trough is of the order which the interlayer can sufficiently absorb.

The dimensions of the above convex portion and of the above concave portion are not particularly restricted unless the parameters specific to the respective aspects of the invention are dissatisfied but the interval (pitch) of convex portions is preferably 10 μm to 1 cm, more preferably 50 to 1000 μm, particularly preferably 200 to 800 μm. Within the range of 200 to 800 μm, a still greater improvement in clarity is obtained. The height of the convex portion is preferably 5 to 500 μm, more preferably 20 to 100 μm. Furthermore, the length of the bottom of each convex portion is preferably 30 to 1000 μm. It should be understood that the term "pitch" as used in this specification means the distance from the center of a convex or concave portion to the center of the adjacent convex or concave portion.

The collapsibility of the embossment at preliminary contact bonding is largely dependent on the volume of the embossment. The determinants of the volume of embossments are the pitch and arrangement of convex portions and the expanse of the plateau-forming top of the convex portion. The larger the plateau-forming top of the convex portion is, the larger is the volume of embossments that can be established and, hence, the degree of coarseness of embossing can be smaller. When a large embossment volume can be set, there can be obtained an interlayer for a laminated glass which is free from the problem of premature sealing. At the temperature necessary for marginal sealing at preliminary contact bonding, the interlayer for a laminated glass becomes sufficiently fluid so that insofar as the coarseness of embossment is within a given range, the margin can be sufficiently sealed.

The first aspect of the present invention is concerned with an interlayer for a laminated glass in which a pitch of embossments on one side is different from a pitch of embossments on the other side.

By embossing in such manner that the pitch of embossments on one side of the interlayer is different from the pitch of embossments on the other side in accordance with the first aspect of the invention, appearance of said moiré phenomenon can be effectively inhibited even if the arrangement and pitch of embossments are comparatively orderly.

Generally speaking, appearance of the moiré phenomenon is liable to occur when the embossments on the both sides of an interlayer are nearly identical in arrangement and pitch. Therefore, by embossing in such manner that the pitch of embossment is different from the pitch on the other side, that is to say by creating a difference between the pitch of embossments on one side and the pitch of embossments on the other side intentionally, it becomes possible to effectively inhibit appearance of the moiré phenomenon even when the arrangement and pitch of embosses on each side are comparatively orderly.

In the first aspect of the invention, it is preferable that the concave portions on at least one side are continual.

By insuring that the concave portions of the embossment on at least one side of an interlayer is continual, the concave portions of the embossment become intercommunicable so that the efficiency of deaeration in preliminary contact bonding is remarkably improved and, hence, the resulting laminated glass will be of high quality with a minimized incidence of rejects for reasons of inclusion of air bubbles. Furthermore, it is more preferable that the bottoms of the concave portion on at least one side of the interlayer are continual.

In the first aspect of the invention, the pitch of embossments on one side of the interlayer is preferably not less than 1.25 times the pitch of embossments on the other side. If the pitch of embossments on one side is smaller than 1.25 times the pitch of embossments on the other side, the inhibitory effect on appearance of the moiré phenomenon tends to be insufficient. The more preferred ratio is not less than 1.3 times.

Furthermore, in the first aspect of the invention, it is preferable that the pitch (L1) of embossments on one side and the pitch (L2) of embossments on the other side satisfy the relation of (L1)<(L2), and the proportion of existence of a convex portion on the other side within the range (L1× 0.25) of before and after a position of a convex portion on one side is not more than 50% of the number of convex portions on one side. When the convex portions satisfy the topological conditions defined above, the concave portions also satisfy the above topological conditions. Thus, the proportion of existence of a concave portion on the other side within the range (L1×0.25) of before and after the position of a concave portion on one side is preferably not more than 50% of the number of concave portions on one side. As used in this specification, the term "position of a convex portion or a concave portion" means the position of the center of the convex or concave portion and the term "existence of a convex portion or a concave portion" means the existence of the center of a convex or concave portion. When the embossment on one side and the embossment on the other side are arranged to satisfy the above requirement, appearance of the moiré phenomenon can be effectively inhibited. The more preferred proportion is not more than 30%, the still more preferred proportion is not more than 10%, and the particularly preferred proportion is 0%, that is the case where, within the range (L1×0.25) of before and after the position of a convex or concave portion on one side, there exists not a single convex portion or concave-portion, as the case may be, on the other side.

Furthermore, in the first aspect of the present invention, it is preferable that the concave portions on at least one side are provided in a linear pattern.

While the emboss pattern of depressions is not limited to a linear one but may for example be a grid pattern, a radiant pattern, or a hemispherical pattern, a further improvement in the deaeration efficiency at preliminary contact bonding can be realized by adopting a linear pattern for concave portions on at least one side of the interlayer.

In the first aspect of the invention, it is so arranged that the pitch of embossments on one side is different from the pitch of embossments on the other side. As this difference is intentionally created between the pitch of embossments on one side and the pitch of embosses pattern on the other side, the moiré phenomenon does not take place even when the arrangement and pitch of embosses are orderly, so that the workability in cutting and laminating operations are improved.

Furthermore, when the embossment is such that the concave portions on at least one side are continual, the concave portions of the embossment are intercommunicable so that the deaeration efficiency at preliminary contact bonding in laminated glass processing is improved. Therefore, the resulting laminated glass is of high quality with a minimized incidence of rejects for reasons of inclusion of air bubbles.

In addition, by carrying out embossing in such manner that the pitch of the embossments on one side will be not smaller than 1.25 times the pitch of the embossments on the other side or the proportion of existence of a convex portion on the other side within the range (L1×0.25) of before and after the position of a convex portion on one side will be not more than 50% of the number of convex portions on one side, the inhibitory effect on the moiré phenomenon is still further improved.

Furthermore, by embossing in such a manner that the pattern of concave portions on at least one side will be a linear pattern, the deaeration efficiency-improving effect is further enhanced.

The second aspect of the invention is concerned with an interlayer for a laminated glass in which the concave portion on at least one side has a trough-like geometry with a continual bottom while the convex portion on the same side has a plateau-forming top.

In the second aspect of the invention in which the concave portion on at least one side has a trough-like geometry with a continual bottom, a marked improvement in deaeration efficiency can be realized.

Furthermore, in this second aspect of the invention, the projecting top of the convex portion is flattened. The larger the area of the plateau-forming top is, the larger is the volume of convex portions of the embossment, with the result that the average surface roughness of the emboss can be relatively reduced and, hence, said premature marginal sealing of the glass-interlayer assembly in the preliminary contact bonding stage can be effectively prevented. Moreover, the interlayer will be sufficiently fluid at the ordinary temperature which is necessary for effecting a marginal seal of the glass-interlayer assembly in the preliminary contact bonding stage and, therefore, to effect a sufficient marginal seal at such an ordinary temperature, the average surface roughness of the embossment is preferably not greater than 100 μm, more preferably not greater than 70μm.

Since, in the second aspect of the invention, the concave portion on at least one side has a trough-like geometry with a continual bottom while the convex portion on the same side has the plateau-forming top, the section perpendicular to the direction of extension of the convex portion has a trapezoid configuration with an increased top area of the convex portion and the consequently increased volume of the convex portion so that the premature marginal sealing of the glass-interlayer assembly is effectively precluded in the preliminary contact bonding stage. Therefore, the air present in the central area of the glass-interlayer assembly can be effectively removed in the preliminary contact bonding stage.

The above-mentioned convex portion preferably has fine concave and convex portions on the plateau-forming top surface. Flattening the top of the convex portion may result in an increased self-adhesion of the interlayer but this self-adhesion can be suppressed for improved handleability by forming such fine concave and convex portions on said plateau.

The surface roughness of said top surface is preferably not less than Ra=2.5 μm. When Ra is not less than 2.5 μm, the sheet-to-sheet contact area of the interlayer is so small that even when the interlayer is stored as a stack in the conventional manner, self-adhesion will not be a matter of concern. More preferably, Ra is not less than 3.0μm.

Figure 7:
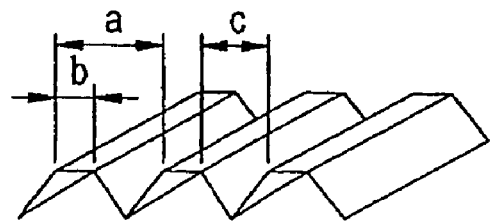
FIG. 7 is a schematic diagram illustrating the embossment pattern (concave and convex patterns) of the interlayers for laminated glass which are obtained in Examples 8 and 9.
Figure 7:
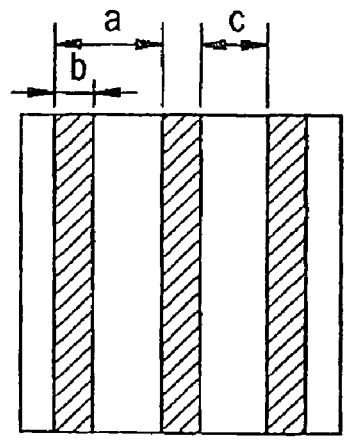

FIG. 7 is a schematic diagram showing the emboss pattern (concave and convex patterns) of the interlayers obtained in Example 8 and Example 9 which are described hereinafter. In FIG. 7, a represents the interval (pitch) of convex portions of the embossment and b represents the width of the plateau-forming top of the convex portion of the embossment.

In the second aspect of the invention, said width (b) of the plateau is preferably not less than 20% of the pitch of convex portions, i.e. b/a is preferably not less than 20%. If b/a is less than 20%, there may not be obtained a sufficient increase in said volume of convex portions so that said premature marginal sealing may not be well inhibited. On the other hand, if b/a is as great as 100%, there will exist substantially no concave portion of the embossment. Therefore, b/a is preferably less than 100%, more preferably not more than 90%.

Moreover, in the second aspect of the invention, the width of said plateau may all be constant or may vary locally, i.e. may be of random width.

In the second aspect of the invention, it is preferable that the pitch of concave and convex patterns on one side is different from the pitch of concave and convex patterns on the other side. If these are equal, the moiré phenomenon tends to take place.

The embossment pattern (concave and convex patterns) in the second aspect of the invention is not particularly restricted but includes linear, grid-like, radial and hemispherical, among others.

Since, in the second aspect of the invention, said concave portions on at least one side of the interlayer form a trough-like geometry which is continual at the bottom, the bottom of said concave portions is continual so that good deaeration can be achieved in preliminary contact bonding.

In addition, since the top of said convex portion forms a plateau, the area of the top of said convex portion and the volume of said convex portion are increased so that the premature marginal sealing of the glass-interlayer assembly in preliminary contact bonding is effectively inhibited. Therefore, the air present in the central part of the glass-interlayer assembly is also effectively purged out. In particular, the above characteristics are further improved when the ratio of the width of said plateau at top of said convex portion relative to the pitch of said convex portions is not less than 20%.

The third aspect of the invention is concerned with an interlayer for a laminated glass in which said concave portion on at least one side has a trough-like geometry and segmenting walls are formed in said trough-like geometry.

In the third aspect of the invention, said trough has segmenting walls therein. In this arrangement, even if a positive seal cannot be carried out down to the bottom of the trough, the segmenting walls lying above the level of the bottom of necessity help to insure a positive seal between the interlayer and the glass sheet, thus allowing milder sealing conditions to be employed.

The height of the above segmenting wall is preferably smaller than the depth of the trough. If the height of the segmenting wall is greater than the depth of the trough, there maybe cases in which deaeration and sealing will be insufficient.

The above segmenting walls are preferably arranged at equal intervals. If the interval of the above segmenting walls is not uniform, it may happen that deaeration does not proceed with efficiency.

In the third aspect of the invention, the pitch of the concave and convex patterns on one side is preferably different from the pitch of the concave and convex patterns on the other side. If the pitches are similar, the moiré phenomenon is liable to take place.

The fourth aspect of the invention is concerned with an interlayer for a laminated glass in which said concave portion on at least one side has a trough-like geometry and is not on one and the same level, and a ratio of a surface roughness (Rz) and a surface roughness (Rzv) of a negative model is $Rzv/Rz \geq 0.25$ on at least one side.

Figure 17:
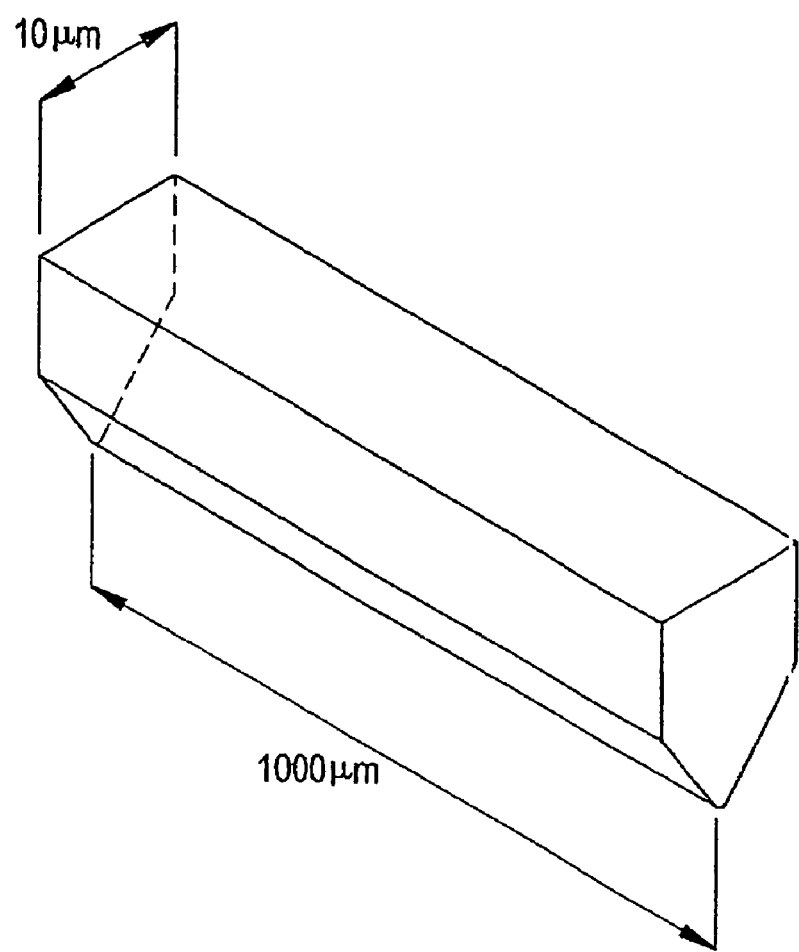
FIG. 17 is a perspective view showing a wedge-shaped tracer (tip width 1000 μm, opposite face angle 90°) for use in Rzv measurement.

Rz, referred to above, represents the surface roughness of the embossments on at least one side and it is a 10-point average roughness as measured with a conical tracer (tip radius of curvature 5 μm, vertex angle 90°) in accordance with JIS B 0601. Rzv, referred to above, represents the surface roughness of the negative model used for the embossment on at least one side and it is a 10-point average roughness as measured with a wedge-shaped tracer shown in FIG. 17 (tip width 1000 μm, opposite face angle 90°) shifted in a direction normal to the tip width in accordance with JIS B 0601.

As used in this specification, the term "not on one and the same level" means that the trough is not uniform in depth.

Rz, referred to above, represents the well-known ordinary 10-point average roughness and is generally measured with a digital tracer-type electric surface roughness analyzer.

Rzv, referred to above, is also generally measured with a digital tracer-type electric surface roughness analyzer.

Stated differently, said Rzv is the 10-point average roughness as measured with a wedge-shaped tracer (tip width 1000 μm) assuming that the convex portion of the embossment on the sheet surface is a concave portion and the concave portion of the embossment is a convex portion. Here, the tip width of the wedge-shaped tracer is set to 1000 μm in consideration of the pitch of the convex portion and concave portion of the embossment (which is usually 200 to 1000 μm). By, using a tracer having a tip width of 1000 μm, the change in geometry of particularly deep concave portions among the concave portions of the embossments can be measured.

The above-mentioned Rzv serves also as a parameter representing the level of the concave portion of the embossment and is closely related to the ease of escape of air in deaeration and the sealing effect. On the other hand, said Rz serves also as a parameter representing the condition of the convex portion of the embossment and is not only related to the resistance to movement of air but is closely related to the ease of collapse of the embossment in laminating work.

Intensive analysis of the relationship of the above Rzv to Rz revealed that when the relation of $Rzv/Rz \geq 0.25$ is satisfied, the deaeration and sealing performances in preliminary contact bonding are satisfactory and, in the final contact bonding carried out under heat and pressure in an autoclave, there is obtained an interlayer almost free of the air bubbles which might be formed between the glass and interlayer due to infiltration of pressurized air from the poorly sealed positions.

Blocking of the interlayer depends on the number of the interlayer stacked during storage but generally an interlayer having a 10-point average roughness (Rz) value of 20 to 100 μm is employed and for such an interlayer, it is only necessary to take into consideration a gravity of the order of about 500 to 1000 sheets. It has been found that the interlayer satisfying the above-defined conditions shows satisfactory blocking resistance under a load of such magnitude and can be easily handled in storage and laminating work.

In the fourth aspect of the invention, the preferred interlayer is one having a defined surface roughness on both sides thereof but an interlayer having a defined surface roughness only on one side with the other side having the conventional embossment comprising fine concave and convex patterns is also acceptable.

In the fourth aspect of the invention, the trough may be provided in a linear configuration or in a grid configuration.

The fifth aspect of the invention is an interlayer for a laminated glass in which the concave portion on at least one side has a continual trough-like geometry and said convex portion on the same side has segmenting troughs while a bottom of said segmenting troughs is not on one and the same level as the bottom of the continual trough-like geometry of said concave portion.

The main function of the segmenting troughs of the convex portion is to control the magnitude of the concave and convex. Thus, when the number of said segmenting troughs is increased, the volume of the concave and convex is decreased to facilitate sealing particularly at the marginal part of the glass-interlayer assembly and conversely when the number of said segmenting troughs is decreased, the volume of surface irregularities is increased so that the premature marginal sealing and consequent entrapment of air in the central region of the glass-interlayer assembly can be effectively precluded.

The geometry of said segmenting trough in the convex portion can be freely controlled so that an interlayer having both a good deaeration characteristic due to the continual trough-like geometry of the concave portion and the good sealing characteristic due to the above-segmenting troughs of the convex portion can be provided easily and efficiently in response to varied processing needs of various users.

Figure 18:
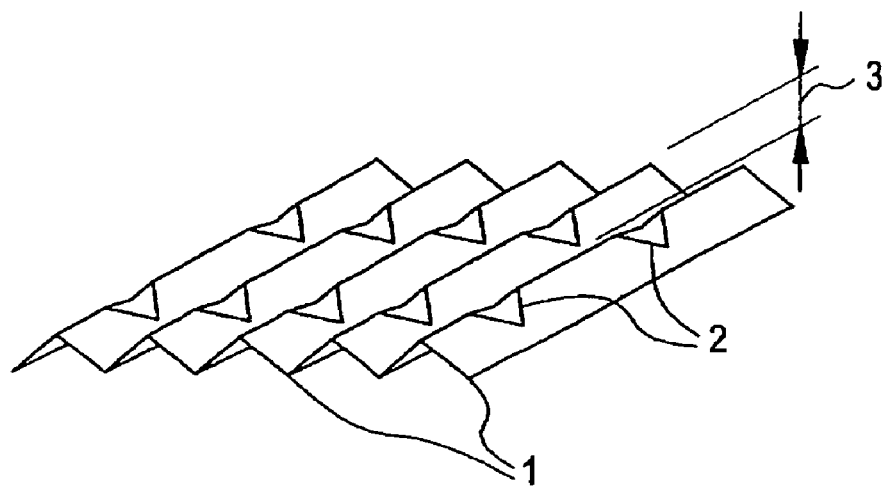
FIG. 18 is a perspective view showing the embossment pattern of the interlayer for a laminated glass according to the fifth aspect of the invention.
Figure 19:
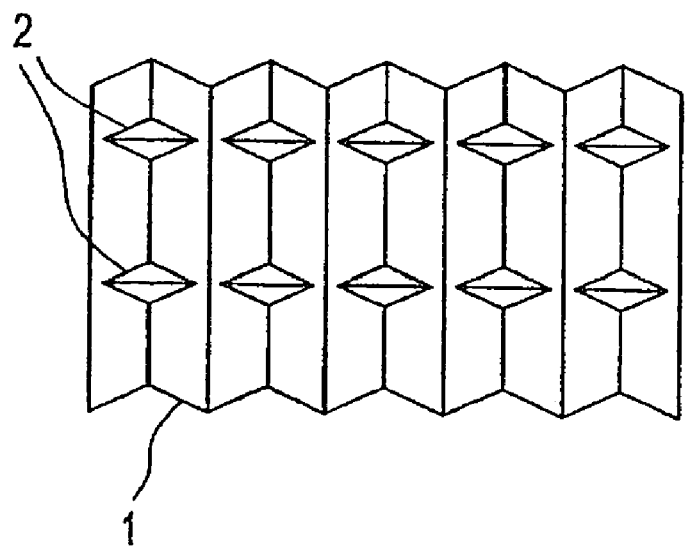
FIG. 19 is a plan view showing the embossment pattern of the interlayer for a laminated glass according to the fifth aspect of the invention.

FIG. 18 is a perspective view showing the emboss design of an interlayer for a laminated glass according to the fifth aspect of the invention and FIG. 19 is a plan view of the same.

In the fifth aspect of the invention, the trough-like geometry 1 of the concave portion and segmenting troughs 2 of the convex portion may be provided in a grid or a random configuration but the grid configuration is preferred.

Further in the fifth aspect of the invention, the depth of segmenting troughs 3 in the convex portion may be uniform or random, although a uniform depth is preferred.

In the fifth aspect of the invention, both sides of the interlayer preferably have an embossment satisfying the herein-defined conditions but an interlayer having an embossment satisfying defined conditions only on one side with the other side having the conventional embossment is also acceptable.

In the fifth aspect of the invention, the concave portions on at least one side have a continual trough-like geometry and even when the geometry of the embossment is destroyed under heat and pressure in the preliminary contact bonding of the glass-interlayer assembly, the continual trough-like geometry of the concave portion persists to the last. Therefore, sufficient deaeration can be achieved.

Furthermore, in the fifth aspect of the invention, the convex portion complementary to the concave portion has segmenting walls and, moreover, the bottom of the segmenting trough is not on one and the same level as the bottom of the continual trough-like geometry of the concave portion, the sealing performance in laminated glass processing can be improved by controlling the geometry of the segmenting trough of the convex portion. Furthermore, through such control of the geometry of the segmenting trough of the convex portion, the different processing needs of various users can be met with ease and efficiency.

The sixth aspect of the invention is concerned with an interlayer for a laminated glass in which at least one side is provided with concave troughs, and an angle between said concave trough and a direction of extrusion of the thermoplastic resin sheet is less than 25°.

If this angle between the concave trough provided on the thermoplastic resin sheet used in sixth aspect of the invention and the extrusion direction of the thermoplastic sheet is too large, bubbling (formation of air bubbles) tends to occur in the laminated glass particularly when the preliminary contact bonding is performed by the draw deaeration method and, moreover, if the concave trough extends to the edge of the sheet, a sealing defect occurs to entrap air in the final contact bonding which is carried out under heat and pressure in an autoclave. Therefore, said angle is restricted to less than 25°, preferably less than 15°.

The concave trough mentioned above is a continual trough and when a plurality of troughs are present, they are preferably identical in depth, width and pitch, although there may be a moderate undulation at the bottom of the trough or they may be randomly present, varying in depth, width, and/or pitch. The sectional configuration of the concave trough is not particularly restricted but each trough may for example be V-shaped, U-shaped, or bracket-shaped.

Regarding the depth of the above concave trough, if the trough is too shallow, the deaeration performance will be decreased and if it is too deep, a sealing defect may develop. Therefore, the depth of the trough is preferably 5 to 500 µm, more preferably 20 to 70 µm. The width of the trough is preferably 20 to 100 µm, for if it is too narrow, the deaeration performance will be poor and if it is too broad, a sealing defect tends to develop. The interval (pitch) of concave troughs is preferably 0.1 to 10 mm, more preferably 0.2 to 1 mm, for if the interval is too small, the deaeration performance will be poor and if it is too large, a sealing defect tends to develop.

In the sixth aspect of the invention, concave troughs need only be formed on at least one side of a thermoplastic resin sheet. Thus, it is optional to provide the interlayer with troughs on one side or on both sides but in order that a sufficient deaeration effect maybe obtained, troughs are preferably formed on both sides.

In the sixth aspect of the invention, the thermoplastic resin sheet is formed not only with concave troughs but also with a multiplicity of fine depressions and convex portions as embossed on both sides. The distribution of these fine concave and convex may be orderly or not orderly. Moreover, the depth and height of concave and convex may each be uniform throughout or varying.

In the sixth aspect of the invention which has the above constitution, concave troughs persist even after the concave and convex of the embossment are abolished by heat and pressure in preliminary contact bonding, particularly in the draw deaeration process in processing laminated glass. Therefore, sufficient deaeration can be insured.

When the draw deaeration method is used in preliminary contact bonding, the ease of escape of air in this preliminary contact bonding stage is closely and substantially exclusively related to the proportion of concave troughs relative to the total depression portion and the flatness and smoothness of the concave troughs, with the pitch and arrangement of convex portions being not so influential factors.

In the sixth aspect of the invention, by virtue of the formation of concave troughs in parallel with the extrusion direction, a route for air can be insured even when, for example, the convex portion is in the form of a mountain ridge, the deaeration passageway is arranged in a grid form, and deaeration is performed at right angles with the mountain ridge. Therefore, even when the deaeration is carried out at right angles with said mountain ridge, the air will not be dammed and, hence, no air pool will be formed.

Furthermore, in the recent technology for laminated glass production, it is the rule rather than exception to construct a glass-interlayer assembly along the winding flow direction of the interlayer (generally the extrusion direction of the thermoplastic resin sheet) and carrying out a draw deaeration along the winding flow direction. Therefore, the marginal sealability of the interlayer in preliminary contact bonding is improved when concave troughs are oriented along the winding flow direction of the interlayer.

Furthermore, when a glass-interlayer assembly is subjected to preliminary contact bonding, many processing manufactures generally set the initial speed at insertion of the assembly into the multiroll system and the speed immediately before takeoff at definitely slower levels compared with the normal speed for the purpose of preventing cracking of glass due to curving, with the result that the leading end and trailing end of the laminate can be sufficiently sealed even if the roughness of the embossment and the size of the concave trough at these ends are large. There is no problem with sealing at the lateral edges unless a concave trough exists at the lateral edge of the assembly.

The seventh aspect of the invention is concerned with an interlayer for a laminated glass in which concave portion on at least one side has a trough-like geometry, and said trough-like geometry is constant in sectional area while has a depth distribution of troughs having a depth of not less than 5% of the maximum trough depth.

In the seventh aspect of the invention, the concave portion on at least one side has the trough-like geometry and, with the depth of the trough being reduced locally, has a depth distribution of troughs having a depth of not less than 5% of the maximum trough depth, while the sectional area of the trough-like geometry is kept constant. Therefore, in the deaeration by the vacuum deaeration technique, an effective route for air is insured at initiation of deaeration and the shallow parts become more ready to adhere to the glass so that the sealability is improved.

Troughs having a depth distribution of not less than 5% of the maximum trough depth as mentioned above are preferably provided at an interval (pitch) of not more than 10 mm. If this pitch exceeds 10 mm, the trouble of bubble formation in the marginal part of the glass-interlayer assembly may occur in the course of deaeration. The more preferred pitch is not more than 2 mm.

In the seventh aspect of the invention, the trough-like geometry is preferably provided in the direction of flow of the interlayer. As used in this specification, the "flow direction" means the direction of travel of the glass-interlayer assembly on a laminated glass production line. In this arrangement, not only the molding of the roll to be used for transfer of the trough-like geometry to the interlayer but also the transfer to the substrate interlayer sheet is facilitated. In addition, this arrangement is preferred in view of the fact that the direction of deaeration in the draw deaeration technique is the flow direction of the interlayer.

The above trough-like geometry need only be formed on one side of the interlayer in accordance with the seventh aspect of the invention but is preferably present on both sides. When the trough-like geometry is present on at least one side of the interlayer of the invention, the formation of air bubbles can be prevented by using the interlayer of the invention when, for example, the inner side of the glass has a distribution of roughness or the interlayer is to be used only on the side for absorbing the steps due to black ceramics printing or the like.

The interlayer according to the seventh aspect of the invention can be used with advantage when the deaeration is performed by the vacuum deaeration technique but by increasing the fineness of the trough, for example by reducing the depth of the trough to less than about 30 μm, it can be used with success when the deaeration is performed by the draw deaeration technique as well.

The technology of creating said trough-like geometry includes, for example, the method which comprises processing the surface of a metal roll or a flat plate (pressed plate) into a convex (ridge-like) form and transfer the form to a substrate interlayer.

Referring, further, to the above trough-like geometry, the depth of the trough can be varied with its sectional area kept constant by indenting the surface ridge of a metal roll or flat plate (pressed plate) locally and particularly the method which comprises biasing a mill having a defined geometry against said surface to vary the depth of the trough is preferred in that the sectional area of the trough can be easily kept constant. In contrast, if the surface ridge of a metal roll or flat plate (pressed plate) is machined with a bit or the like to reduce its height, the sectional area of that portion will be decreased.

The interlayer according to the present invention is used for the manufacture of laminated glass products. Such a laminated glass can be obtained by interposing the interlayer of the invention between at least one pair of glass sheets and consolidating the assembly into an integral unit.

The glass sheet mentioned above is not particularly restricted but includes inorganic glass sheets; and organic glass sheets such as the polycarbonate sheet, polymethyl methacrylate sheet, and so forth.

The structure of said laminated glass need only be such that the interlayer of the invention is interposed between two glass sheets and is otherwise not particularly restricted. Thus, the structure is not restricted to the 3-layer structure of sheet glass/interlayer/sheet glass but may be a multilayer structure of, for example, sheet glass/interlayer/sheet glass/ interlayer/sheet glass.

The technology of manufacturing a laminated glass product using the interlayer of the invention is not particularly restricted. Thus, the desired laminated glass can be obtained by the same production technology as used in the manufacture of the conventional laminated glass, for example by interposing the interlayer between at least one pair of glass sheets, subjecting the whole to preliminary contact bonding for deaeration and provisional adhesion, and subjecting it to final contact bonding, for example, in an autoclave.

When the laminated glass is to be manufactured using the interlayer made of, for example, a plasticized polyvinyl butyral resin sheet in accordance with the invention, the preliminary contact bonding and final contact bonding can for example be carried out in accordance with the following procedures.

The preliminary contact bonding procedure may comprise interposing the interlayer between two transparent inorganic glass sheets and passing the assembly over a nip roll for preliminary contact bonding with concurrent deaeration for example at a pressure of 2 to 1000 kPa and a temperature of 50 to 100° C. (draw deaeration technique) or accommodating said assembly in a rubber bag, connecting the bag to a vacuum system, and evacuating the bag to a vacuum of −40 to −75 kPa (absolute pressure 36 to 1 kPa) while increasing the temperature for preliminary contact bonding at 60 to 100° C. (vacuum deaeration technique).

The assembly subjected to the preliminary contact bonding procedure is further subjected to final contact bonding in an autoclave in the conventional manner or by means of a press set to a temperature of 120 to 150° C. under a pressure of 200 to 1500 kPa to give the laminated glass.

The laminated glass thus manufactured also constitutes one aspect of the present invention.

BEST MODE FOR CARRYING OUT THE INVENTION

The following examples illustrate the present invention in further detail without defining the scope of the invention.

EXAMPLE 1

To 100 parts by weight of polyvinyl butyral resin (average degree of polymerization 1700, residual acetyl group 1 mol %, butyralization degree 65 mol %) was added 40 parts by weight of the plasticizer triethylene glycol-di-2-ethylbutyrate, and using an extruder, the resulting mixture was melt-kneaded and extruded in a sheet form from the extrusion die to give a 0.76 mm-thick polyvinyl butyral resin sheet (PVB sheet).

An engraving mill (mother mill) having a linear embossment design (concave and convex patterns) for embossing use was forced against the surface of one of a pair of metal embossing rolls and this metal roll and the engraving roll were driven in association to transfer the embossment design of the engraving mill to the metal roll. Then, the engraving mill was shifted in the axial direction of the metal roll in steps of the unit embossment design to transfer the embossment design of the engraving mill to the metal roll in the same manner as above to construct an embossing roll having an orderly array of linear embossment designs. The embossment pitch of the engraving mill was 250 μm.

An engraving mill (mother mill) having a linear embossment design was forced against the surface of the other metal roll of said pair of embossing rolls and the metal roll and the engraving mill were driven in association to transfer the embossment design of the engraving mill to the metal roll. Then, the engraving mill was shifted in the axial direction of the metal roll in steps of the unit embossment design to transfer the embossment design of the engraving mill serially to the metal roll in the same manner as the above to construct an embossing roll with an orderly array of linear embossment designs. The pitch of the emboss design of said engraving mill was 320 μm.

The PVB sheet (0.76 mm thick) obtained as above was passed over the embossing roll pair obtained as above to manufacture an interlayer sheet for laminated glass having an orderly array of linear embossment designs on both sides but varying in the pitch of designs from one side to the other side.

EXAMPLE 2

Except that the pitch of the embossment of one engraving mill (mother mill) was changed to 300 μm and the pitch of the embossment of the other engraving mill (mother mill) was changed to 375 μm, the procedure of Example 1 was repeated to manufacture an interlayer for a laminated glass having an orderly array of linear embossments on both sides and varying in the pitch of embossments from one side to the other side.

EXAMPLE 3

Except that the pitch of the embossments of one engraving mill (mother mill) was changed to 300 μm and the pitch of the embossments of the other engraving mill (mother mill) was changed to 430 m, the procedure of Example 1 was repeated to manufacture an interlayer for a laminated glass having an orderly array of linear embossments on both sides and varying in the pitch of embossments from one side to the other side.

The face side, reverse side, and cross-section views of the embossment designs (concave and convex patterns) of the interlayers for laminated glass as obtained in Examples 1 to 3 are schematically illustrated in FIG. 1.

COMPARATIVE EXAMPLE 1

Except that the pitch of the embossments was set to 300 μm for both engraving mills (mother mills), the procedure of Example 1 was repeated to manufacture an interlayer for a laminated glass having an orderly array of linear embossments on both sides with the same pitch of embossments for both sides.

Figure 2:
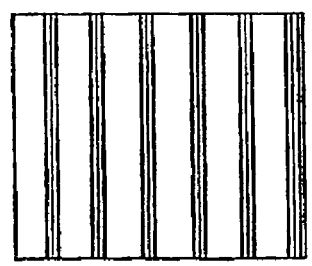
FIG. 2 is a schematic diagram illustrating the embossment pattern of the interlayer for a laminated glass according to Comparative Example 1.
Figure 2:
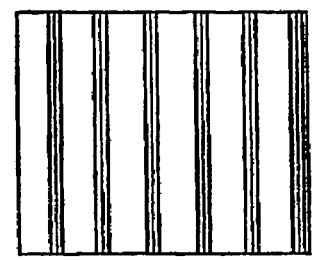
Figure 2:

The face side, reverse side and cross-section views of the embossment design (concave and convex patterns) of the interlayer for a laminated glass as obtained in Comparative Example 1 are schematically shown in FIG. 2.

EXAMPLE 4

To 100 parts by weight of polyvinyl butyral resin (average degree of polymerization 1700, residual acetyl group 1 mol %, butyralization degree 65 mol %) was added 40 parts by weight of the plasticizer triethylene glycol-di-2-ethylbutyrate (3 GH), and, using an extruder, the resulting mixture was melt-kneaded and extruded in a sheet form from the extrusion die to give a 0.76 mm-thick polyvinyl butyral resin sheet (PVB sheet).

An engraving mill (mother mill) having a hemispherical embossment design was forced against the surface of one of a pair of metal embossing rolls and this metal roll and the engraving mill were driven in association to transfer the embossment design of the engraving mill to the metal roll. Then, the engraving mill was shifted in the axial direction of the metal roll in steps of the unit embossment design to transfer the embossment design of the engraving mill to the metal roll in the same manner as above to construct an embossing roll having an orderly array of hemispherical embossments. The pitch of the embossments of the engraving mill was 200 μm.

An engraving mill (mother mill) having a hemispherical embossment design was forced against the surface of the other metal roll of said pair of embossing rolls and the metal roll and the engraving mill were driven in association to transfer the embossment design of the engraving mill to the metal roll. Then, the engraving mill was shifted in the axial direction of the metal roll in steps of the unit embossment design to transfer the embossment design of the engraving mill serially to the metal roll to construct an embossing roll having an orderly array of hemispherical embossments. The pitch of embossments of said engraving mill was 300 μm.

Figure 3:
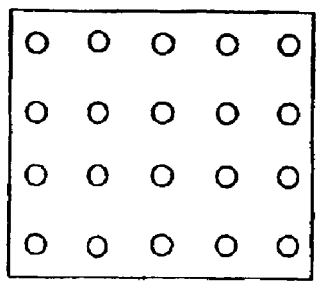
FIG. 3 is a schematic diagram illustrating the embossment pattern of the interlayer for a laminated glass according to Example 4.
Figure 3:
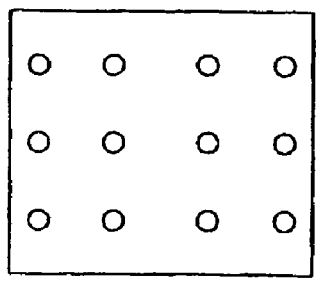
Figure 3:

The PVB sheet (0.76 mm thick) obtained as above was passed over the embossing roll pair obtained as above to manufacture an interlayer for a laminated glass having an orderly array of hemispherical embossments on both sides but varying in the pitch of embossments from one side to the other side. The face side, reverse side and cross-section views of the embossment pattern of the interlayer thus obtained are shown in FIG. 3.

EXAMPLE 5

Figure 4:
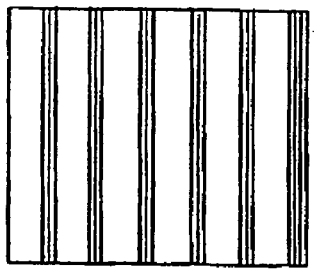
FIG. 4 is a schematic diagram illustrating the embossment pattern of the interlayer for a laminated glass according to Example 5.
Figure 4:
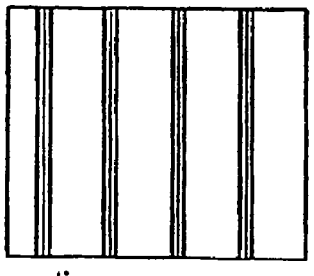
Figure 4:

Except that a linear embossment design was used for engraving mills (mother mills) and the pitch of embossments of one of the engraving mills was set to 250 μm and that of the other engraving mill to 300 μm, the procedure of Example 4 was otherwise repeated to manufacture an interlayer for a laminated glass having a linear embossment pattern on both sides and varying in the pitch of embossments from one side to the other side. The face side, reverse side, and cross-section views of the embossment design of the interlayer thus obtained are shown in FIG. 4.

EXAMPLE 6

Figure 5:
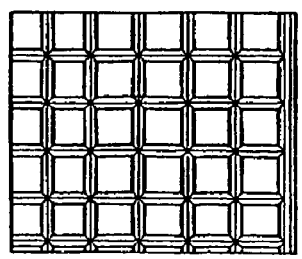
FIG. 5 is a schematic diagram illustrating the embossment pattern of the interlayer for a laminated glass according to Example 6.
Figure 5:
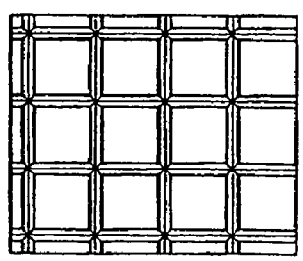
Figure 5:

Except that a grid embossment design was used for engraving mills (mother mills) and the pitch of embossments of one of the engraving mills was set to 200 μm and that of the other engraving mill to 400 μm, the procedure of Example 4 was otherwise repeated to manufacture an interlayer for a laminated glass having a grid pattern of embossments on either side and varying in the pitch of embossments from one side to the other side. The face side, reverse side, and cross-section views of the embossment design of the interlayer thus obtained are shown in FIG. 5.

EXAMPLE 7

Except that a linear embossment design with a pitch of 220 μm was used for one of the engraving mills (mother mills) and the grid embossment design with a pitch of 320 μm was used for the other engraving mill, the procedure of Example 4 was otherwise repeated to manufacture an interlayer for a laminated glass having an orderly array of linear embossments on one side and an orderly array of grid embossments on the other side and varying in the pitch of embossments from one side to the other.

COMPARATIVE EXAMPLE 2

Figure 6:
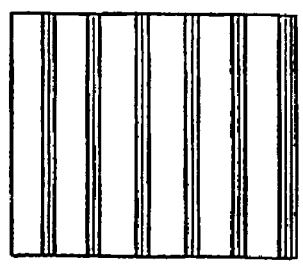
FIG. 6 is a schematic diagram illustrating the embossment pattern of the interlayer for a laminated glass according to Comparative Example 2.
Figure 6:
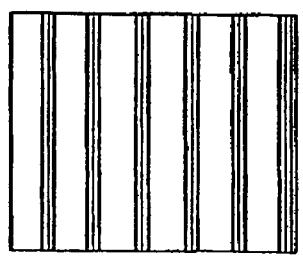
Figure 6:

Except that a linear embossment design with a pitch of 210 μm was used for both engraving mills (mother mills), the procedure of Example 4 was otherwise repeated to manufacture an interlayer for a laminated glass having an orderly linear embossment pattern on both sides at the same pitch of embossments for both sides. The face side, reverse side, and cross-section views of the embossment design of the interlayer thus obtained are shown in FIG. 6.

Using the 9 kinds of interlayers obtained in Examples 1 to 7 and Comparative Examples 1 and 2, respectively, the average surface roughness (Rz) and average pitch (Sm) of embossments on each side were measured by the following methods. The results are shown in Table 1 and Table 2.

(Measurement of Rz)

Using a digital tracer system electric surface roughness analyzer (trade name "SE-2000", manufactured by Kosaka Kenkyusho) and a conical tracer (tip radius of curvature 5 μm, vertex angle 90 degrees), the 10-point average surface roughness {Rz (μm)} of the embossment design on each side of the interlayer was measured in accordance with JIS B0601.

(Measurement of Sm)

Under the microscope, the average pitch {Sm (μm)} of embosses on each side of the interlayer was measured.

Furthermore, with each of said 9 kinds of interlayers, the appearance of the moiré phenomenon was evaluated by the following method. The results are shown in Table 1 and Table 2.

(Appearance of the Moiré Phenomenon)

The interlayer was moved slowly and continuously and the appearance of the moiré phenomenon was visually monitored.

Then, using each of said 9 kinds of interlayers, preliminary contact bonding was carried out by the following two alternative methods (draw deaeration and vacuum deaeration), followed by final contact bonding to fabricate 9 kinds of laminated glass sheets.

(a) Draw Deaeration

The interlayer was sandwiched between two sheets of transparent float glass (30 cm long×30 cm wide×3 mm thick) and the superfluous part was trimmed off. The resulting assembly was heated in an oven to an article temperature (preliminary contact bonding temperature) of 60° C., 70° C. or 80° C. and passed over a nip roll (air cylinder pressure 350 kPa, linear velocity 10 m/min) for preliminary contact bonding.

(b) Vacuum Deaeration

The interlayer was sandwiched between two sheets of transparent float glass (30 cm long×30 cm wide×3 mm thick) and the superfluous part was trimmed off. The resulting assembly was transferred into a rubber bag and, with the rubber bag connected to a suction system, heated by external heating while maintaining at a negative pressure of −60 kPa (absolute pressure 16 kPa) for 10 minutes. After the assembly had been heated to an article temperature (preliminary contact bonding temperature) of 60° C., 80° C. or 100° C., the pressure was returned to atmospheric pressure to complete preliminary contact bonding.

The assembly subjected to preliminary contact bonding by the above method (a) or (b) was held in an autoclave at a temperature of 140° C. and a pressure of 1.3 MPa for 10 minutes, at the end of which time the temperature was lowered to 50° C. and the pressure was returned to atmospheric pressure to complete the final contact bonding and provide a laminated glass.

The 9 kinds of laminated glass obtained as above were subjected to a bake test according to the following protocol and the deaeration performance of preliminary contact bonding was evaluated. The results are shown in Table 1 and Table 2.

(Bake Test of Laminated Glass)

The laminated glass was heated in an oven at 140° C. for 2 hours. Then, the glass was taken out of the oven, allowed to cool over 3 hours, and was visually inspected to count the number of sheets with air bubbles and evaluate the deaeration performance. The number of sheets tested was 100 for each glass product. The fewer the number of glass sheets with air bubbles is, the superior is the deaeration and sealing performance.

TABLE 1

| | | | Example 1 | Example 2 | Example 3 | Compar. Ex. |
|---|---|---|---|---|---|---|
| Embossment of interlayer | Embossment design | | Linear | Linear | Linear | Linear |
| | Embossment arrangement | | Orderly | Orderly | Orderly | Orderly |
| | Face side | Average surface roughness: Rz (μm) | 36.2 | 43.2 | 44.5 | 40.6 |
| | | Average pitch: Sm (μm) | 252.0 | 302.2 | 303.0 | 305.0 |
| | Reverse side | Average surface roughness: Rz (μm) | 42.5 | 43.0 | 39.4 | 41.2 |
| | | Average pitch: Sm (μm) | 324.0 | 372.5 | 431.2 | 305.0 |
| | | Incidence of moiré | No | No | No | Yes |
| Preliminary contact bonding temperature (° C.) | Draw deaeration | | 60  70  80 | 60  70  80 | 60  70  80 | 60  70  80 |
| | Vacuum deaeration | | 60  80  100 | 60  80  100 | 60  80  100 | 60  80  100 |

TABLE 1-continued

| | Example 1 | | | Example 2 | | | Example 3 | | | Compar. Ex. | | |
|---|---|---|---|---|---|---|---|---|---|---|---|---|
| Bake test of laminated glass (the number of sheets with air bubbles/100 sheets) Draw deaeration | 0 | 1 | 0 | 2 | 0 | 0 | 0 | 1 | 0 | 0 | 2 | 0 |
| Vacuum deaeration | 1 | 0 | 0 | 0 | 0 | 0 | 1 | 0 | 1 | 1 | 0 | 0 |

TABLE 2

| | | | Example 4 | | | Example 5 | | | Example 6 | | | Example 7 | | | Compar. Ex. 2 | | |
|---|---|---|---|---|---|---|---|---|---|---|---|---|---|---|---|---|---|---|
| Embossment of interlayer | Embossment design | Face side | Hemispherical | | | Linear | | | Grid | | | Linear | | | Linear | | |
| | | Reverse side | Hemispherical | | | Linear | | | Grid | | | Grid | | | Linear | | |
| | Embossment arrangement | | Orderly | | | Orderly | | | Orderly | | | Orderly | | | Orderly | | |
| | Average surface | Face side | 36.2 | | | 43.2 | | | 44.5 | | | 42.5 | | | 40.6 | | |
| | roughness: Rz (µm) | Reverse side | 42.5 | | | 43.0 | | | 39.4 | | | 40.6 | | | 41.2 | | |
| | Average pitch: | Face side | 210.0 | | | 255.2 | | | 213.0 | | | 220.4 | | | 215.0 | | |
| | Sm (µm) | Reverse side | 310.0 | | | 302.5 | | | 421.2 | | | 320.2 | | | 210.2 | | |
| | Incidence of moiré | | No | | | No | | | No | | | No | | | Yes | | |
| Preliminary contact bonding temperature (° C.) | Draw deaeration | | 60 | 70 | 80 | 60 | 70 | 80 | 60 | 70 | 80 | 60 | 70 | 80 | 60 | 70 | 80 |
| | Vacuum deaeration | | 60 | 80 | 100 | 60 | 80 | 100 | 60 | 80 | 100 | 60 | 80 | 100 | 60 | 80 | 100 |
| Bake test of laminated glass (the number of sheets with air bubbles/100 sheets) | Draw deaeration | | 0 | 1 | 0 | 2 | 0 | 0 | 0 | 1 | 0 | 0 | 1 | 1 | 0 | 2 | 0 |
| | Vacuum deaeration | | 1 | 0 | 0 | 0 | 0 | 0 | 1 | 0 | 1 | 2 | 0 | 0 | 1 | 0 | 0 |

It is apparent from Tables 1 and 2 that the interlayers for laminated glass according to Examples 1 to 7 of the invention were invariably free of the moiré phenomenon. This result indicates good work ability in cutting and laminating operations. Furthermore, the laminated glass products using the above interlayers according to Examples 1 to 7 invariably showed few sheets with air bubbles (rejects) in the bake test, regardless of the preliminary contact bonding temperature used in the draw deaeration process or the vacuum deaeration processes. These results indicate an invariably satisfactory deaeration performance in preliminary contact bonding.

In contrast, the interlayer for a laminated glass according to Comparative Example 1 as manufactured using a pair of embossing rolls fabricated from two engraving mills (mother mills) with the same pitch of embossments (300 µm) and the interlayer for a laminated glass according to Comparative Example 2 as manufactured by using a pair of embossing rolls fabricated from two engraving mills (mother mills) with the same embossment design (linear) and pitch were both good in deaeration performance at preliminary contact bonding but developed the moiré phenomenon. These results are indicative of poor workability in cutting and laminating operations.

EXAMPLE 8

As the thermoplastic resin sheet, "DXN film" (polyvinyl butyral resin sheet, product of Sekisui Chemical) was used.

A pair of rolls, namely a metal roll subjected to surface milling with a triangular oblique line type mill (product of Yuri Roll Co.) and a rubber roll having a JIS hardness of 45 to 75, was used as the surface irregularity transfer device and said DXD film was passed over this surface irregularity transfer device to apply an embossed depression forming a trough design with a continual bottom on one side of the DXN film. The transfer conditions used were as follows.

Temperature of DXN film: room temperature
Roll temperature: 130° C.
Linear velocity: 10 m/min.
Press linear pressure: 500 kPa Then, the other side of the DXN film was also subjected to the above treatment to give an interlayer having an orderly linear pattern comprising concave portions with a trough-like configuration continual at the bottom and convex portions each having a plateau-forming top on both sides. The interval (pitch) of the embossed convex portions of the interlayer was 300 µm, the width of the plateau-forming top of the embossed convex portion was 250 µm, and the width of the embossed concave portion was 50 µm.

EXAMPLE 9

Except that the pitch of the embossed convex portions was set to 300 µm, the width of the plateau-forming top of the embossed convex portion was set to 160 µm, and the width of the embossed concave portion was set to 140 µm, the procedure of Example 8 was otherwise repeated to give an interlayer having an orderly linear pattern comprising embossed concave portions having a trough-like configuration continual at the bottom and embossed convex portions each having a plateau-forming top on both sides.

The embossment design (concave and convex patterns) of the interlayers obtained in Example 8 and Example 9 is schematically depicted in FIG. 7.

EXAMPLE 10

Except that the interval (pitch) of the embossed convex portions was set to 200 µm, the width of the plateau-forming top of the embossed convex portion-was set to 50 µm, the width of the embossed concave portion was set to 150 µm, and a grid configuration was selected for the embossment design, the procedure of Example 8 was otherwise repeated to give an interlayer having an orderly grid embossment pattern comprising embossed concave portions having a trough-like configuration continual at the bottom and embossed convex portions each having a plateau-forming configuration on both sides.

EXAMPLE 11

Except that the interval (pitch) of the embossed convex portions was set to 500 μm, the width of the plateau-forming top of the embossed convex portion was set to 400 μm, the width of the embossed concave portion was set to 100 μm, and a grid configuration was selected for the emboss design, the procedure of Example 8 was otherwise repeated to give an interlayer having an orderly grid embossment pattern comprising embossed concave portions having a trough-like geometry continual at the bottom and embossed convex portions each having a plateau-forming top on both sides.

Figure 8:
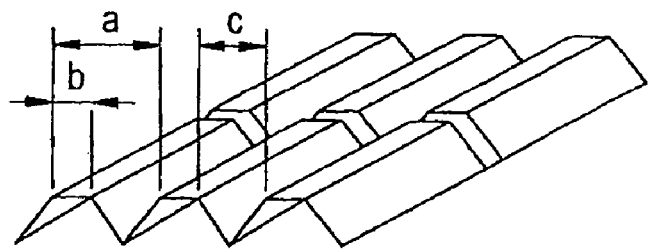
FIG. 8 is a schematic diagram illustrating the embossment pattern (concave and convex patterns) of the interlayers for laminated glass which are obtained in Examples 10 and 11.
Figure 8:
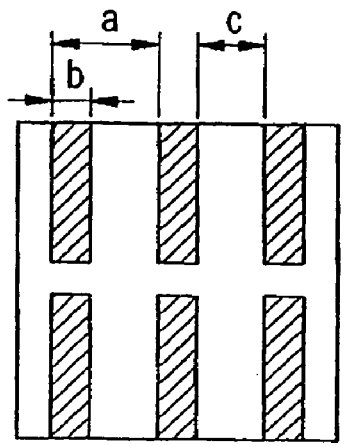

The embossment design (concave and convex patterns) of the interlayers obtained in Example 10 and Example 11 is schematically depicted in FIG. 8.

COMPARATIVE EXAMPLE 3

Figure 9:
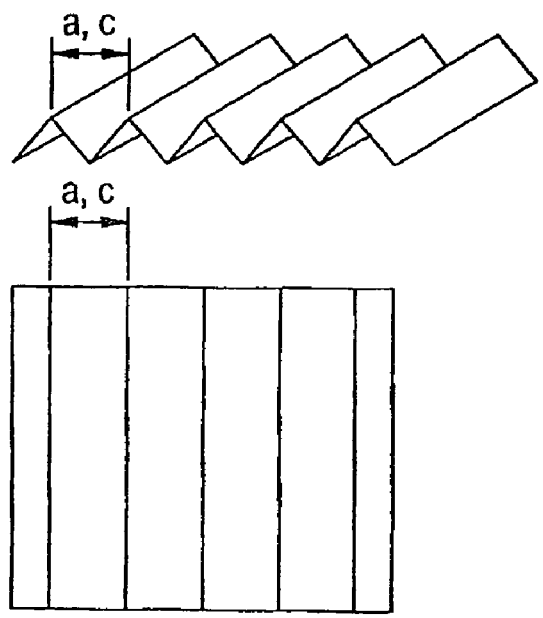
FIG. 9 is a schematic diagram illustrating the embossment pattern (concave and convex patterns) of the interlayer for a laminated glass which is obtained in Comparative Example 3.

Except that the top of the embossed convex portion was not made a plateau and the pitch of embossed convex portions and the width of the embossed concave portion were set to 200 μm, the procedure of Example 8 was otherwise repeated to give an interlayer having an orderly linear emboss pattern comprising embossed concave portions having a trough-like geometry continual at the bottom and embossed convex portions with tops not forming a plateau on both sides. The embossment pattern (concave and convex patterns) of the interlayer obtained in this Comparative Example is schematically depicted in FIG. 9.

With the 5 kinds of interlayers obtained in Examples 8 to 11 and comparative Example 3, the average surface roughness (Rz) of the embossment was measured by the same method as in Example 1. The results are shown in Table 3.

Using each of the above 5 kinds of interlayers, the preliminary contact bonding by the vacuum deaeration method and the final contact bonding were serially carried out in the following manner to construct 5 kinds of laminated glass products.

(Vacuum Deaeration)

The interlayer was sandwiched between two transparent float glass sheets (30 cm long×30 cm wide×30 cm thick) and the superfluous part was trimmed off to fabricate a glass-interlayer assembly. The assembly was transferred into a rubber bag. The rubber bag was connected to a vacuum suction system and heated externally and held at a negative pressure of −60 kPa (absolute pressure 16 kPa) for 10 minutes. The heating was performed until the temperature of the assembly (preliminary contact bonding temperature) had reached 70° C. And the pressure was then returned to atmospheric pressure to complete preliminary contact bonding. The three different deaeration start temperatures of 40° C., 50° C. And 60° C. Were used at preliminary contact bonding.

(Final Contact Bonding)

The glass assembly subjected to preliminary contact bonding in the above manner was placed in an autoclave and held at a temperature of 140° C. and a pressure of 1300 kPa for 10 minutes. The temperature was then lowered to 50° C. And the pressure was returned to atmospheric pressure to complete final contact bonding and give a laminated glass.

The 5 kinds of laminated glass sheets obtained as above were respectively subjected to a bake test in the same manner as in Example 1 to evaluate the deaeration performance at preliminary contact bonding. The results are shown in Table 3.

TABLE 3

| | | | Example 8 | | | Example 9 | | | Example 10 | | | Example 11 | | | Compar. Ex. 3 | | |
|---|---|---|---|---|---|---|---|---|---|---|---|---|---|---|---|---|---|
| Embossment of interlayer | Embossment design | | Linear | | | Linear | | | Grid | | | Grid | | | Linear | | |
| | Embossment arrangement (distribution) | | Orderly | | | Orderly | | | Orderly | | | Orderly | | | Orderly | | |
| | Embossment geometry | Pitch of convex portions (a: μm) | 300 | | | 300 | | | 200 | | | 500 | | | 200 | | |
| | | Width of flat part of convex portions (b: μm) | 250 | | | 160 | | | 50 | | | 400 | | | — | | |
| | | b/a (%) | 83.3 | | | 53.3 | | | 25.0 | | | 80.0 | | | — | | |
| | | Width of concave portions (c: μm) | 50 | | | 140 | | | 150 | | | 100 | | | 200 | | |
| | | Average surface roughness (Rz: μm) | 42.5 | | | 40.5 | | | 45.2 | | | 41.2 | | | 60.2 | | |
| Results of evaluation | Conditions of vacuum deaeration | Initial vacuum temperature (° C.) | 40 | 50 | 60 | 40 | 50 | 60 | 40 | 50 | 60 | 40 | 50 | 60 | 40 | 50 | 60 |
| | | Preliminary contact bonding temperature (° C.) | 70 | 70 | 70 | 70 | 70 | 70 | 70 | 70 | 70 | 70 | 70 | 70 | 70 | 70 | 70 |
| | | Bake test of laminated glass the number of sheets with air bubbles/100 sheets | 0 | 0 | 1 | 0 | 1 | 5 | 1 | 5 | 10 | 1 | 0 | 1 | 10 | 50 | 90 |

It is apparent from Table 3 that the laminated glass sheets manufactured by using the interlayers according to Examples 8 toll of the invention showed few sheets with air bubbles (rejects) in the bake test invariably at the deaeration start temperatures of 40° C., 50° C. And 60° C. in the preliminary contact bonding by the vacuum deaeration method. The result indicates that good deaeration was obtained even without critical control of deaeration start temperature in preliminary contact bonding and even at the ordinary preliminary contact bonding temperature (70° C.), not a deliberately increased preliminary contact bonding temperature.

In contrast, the laminated glass manufactured by using the interlayer of Comparative Example 3 where the top of the embossed convex portion was not flattened to a plateau gave quite many sheets with air bubbles (rejects) in the bake test when the deaeration start temperature in preliminary contact bonding was 50° C. or higher. This result indicates that unless the deaeration start temperature in preliminary contact bonding is strictly controlled to at least below 50° C., the premature sealing takes place around the edge of the glass-interlayer assembly to interfere with a thorough removal of air in the central part of the assembly.

EXAMPLES 12 TO 16

(Preparation of the Interlayer for a Laminated Glass)

For embossing, a variety of embossing rolls were provided. As the thermoplastic resin sheets, DXN films (polyvinyl butyral resin sheet, product of Seisui Chemical) was provided. The Ra values of the DXN films used in Examples 12 to 16 are shown in Table 4.

Using a pair of rolls, namely an embossing roll and a rubber roll, as the surface irregularity transfer device, the above DXN film was passed over this surface irregularity transfer device to give an interlayer for a laminated glass having an embossment pattern on both sides. The transfer conditions used are as follows.
Temperature of DXN film: room temperature
Roll temperature: 130° C.
Linear velocity: 10 m/min
Press linear pressure: 500 kPa The embossment patterns (concave and convex patterns) of the interlayers for laminated glass as obtained in Examples 12 to 16 are shown in Table 4.

Figure 10:
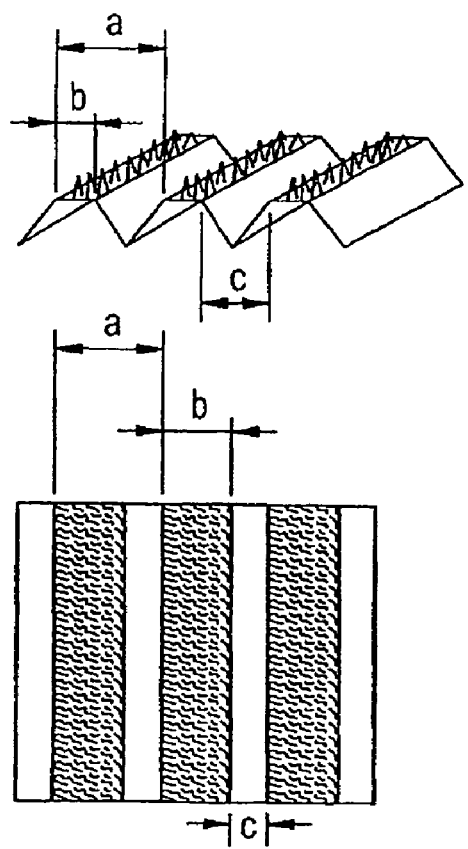
FIG. 10 is a schematic diagram illustrating the embossment pattern (concave and convex patterns) of the interlayers for laminated glass which are obtained in Examples 12 and 13.
Figure 11:
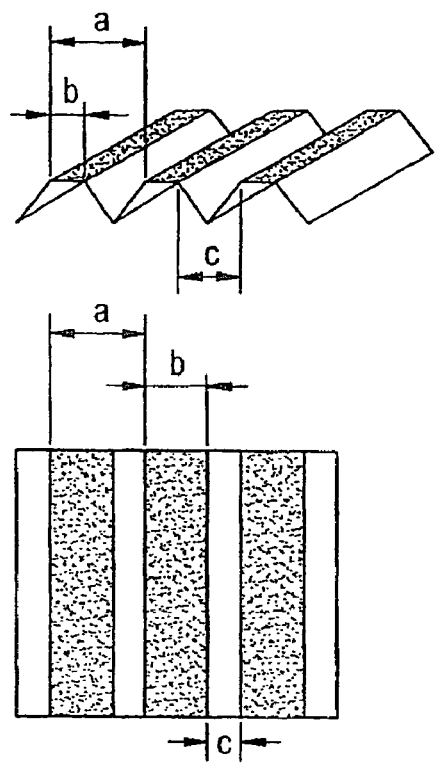
FIG. 11 is a schematic diagram illustrating the embossment pattern (concave and convex patterns) of the interlayers for laminated glass which are obtained in Examples 14 and 15.
Figure 12:
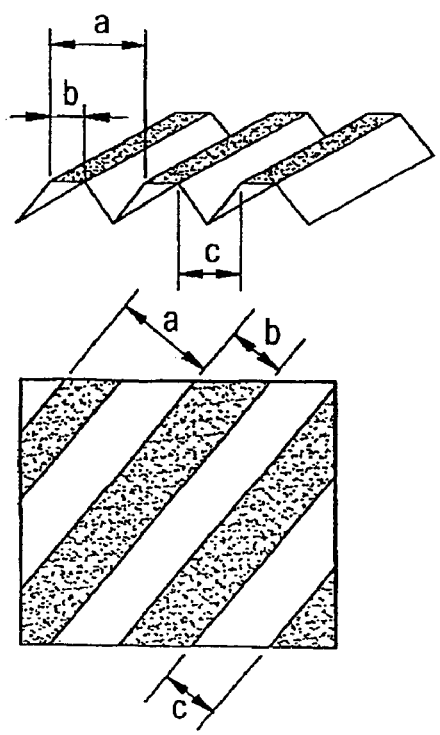
FIG. 12 is a schematic diagram illustrating the embossment pattern (concave and convex patterns) of the interlayer for a laminated glass which is obtained in Example 16.

FIG. 10 shows the embossment pattern (concave and convex patterns) of the interlayers for laminated glass as obtained in Example 12 and Example 13; FIG. 11 shows the embossment pattern (concave and convex patterns) of the interlayers for laminated glass as obtained in Example 14 and Example 15; and FIG. 12 shows the embossment pattern (concave and convex patterns) of the interlayer for a laminated glass as obtained in Example 16.

Figure 13:
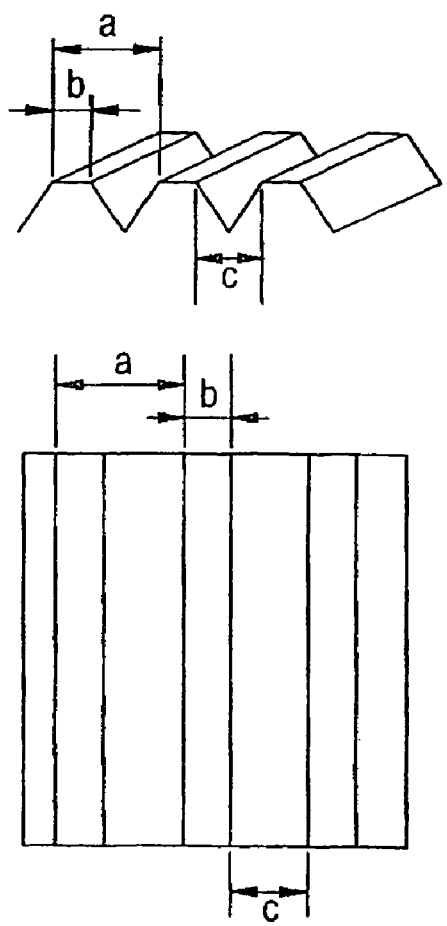
FIG. 13 is a schematic diagram illustrating the embossment pattern (concave and convex patterns) of the interlayer for a laminated glass which is obtained in Comparative Example 4.

FIG. 13 is a schematic representation of the embossment pattern (concave and convex patterns) of the interlayer for a laminated glass as obtained in Comparative Example 4.

For each of the six kinds of interlayers for laminated glass as obtained in Examples and Comparative Example, the average surface roughness (Ra) of the embossment was measured by the method described below and the average surface roughness (Rz) was measured as in Example 1 for the evaluation of handling workability and self-adhesiveness of the interlayer. The results are shown in Table 4.

(Measurement of Ra)

Using a digital tracer-type electric surface roughness analyzer (trade name SE-2000, product of Kosaka Kenkyusho) with a wedge-shaped tracer (tip width 1000 μm, facial angle 90°), the 10-point average surface roughness {Ra (μm)} of the emboss on each side of the interlayer for a laminated glass was measured in accordance with JIS B 0601.

Moreover, using each of the above six kinds of interlayers for laminated glass, preliminary contact bonding by the vacuum deaeration technique and final contact bonding were carried out serially as in Example 8 to manufacture six kinds of laminated glass.

These six kinds of laminated glass were respectively subjected to a bake test under the same conditions as in Example 1 to evaluate the deaeration performance in preliminary contact bonding. The results are shown in Table 4.

TABLE 4

|  |  |  | Example |  |  |  |  | Compar. Ex. |
|---|---|---|---|---|---|---|---|---|
|  |  |  | 12 | 13 | 14 | 15 | 16 | 4 |
| Embossment of interlayer | Embossment design |  | Linear | Linear | Linear | Linear | Linear | Linear |
|  | Embossment distribution |  | Orderly, parallel | Orderly, parallel | Orderly, parallel | Orderly, parallel | Orderly, rotated through 90° | Orderly, parallel |
|  | Embossment geometry | Pitch of main convex portions (a: μm) | 300 | 500 | 300 | 500 | 200 | 200 |
|  |  | Width of flat part of main convex portions (b: μm) | 250 | 400 | 250 | 400 | 100 | 25 |
|  |  | b/a (%) | 83 | 83 | 80 | 83 | 50 | 12.5 |
|  |  | Width of main concave portions (c: μm) | 50 | 100 | 50 | 100 | 100 | 175 |
|  |  | Average surface roughness, 5 μm tracer (Rz: μm) | 42.5 | 40.5 | 45.2 | 41.2 | 50.2 | 55.6 |
|  |  | Average surface roughness, 1000 μm Tracer (Ra: μm) | 4.1 | 3.5 | 2.7 | 2.0 | 2.0 | 0.5 |
| Results of evaluation | Self-adhesive strength (g/15 cm) |  | 350 | 420 | 570 | 980 | 650 | 2540 |
|  | Condtions of vacuum deaeration | Initial vacuum temperature (° C.) | 40  50  60 | 40  50  60 | 40  50  60 | 40  50  60 | 40  50  60 | 40  50  60 |
|  |  | Preliminary contact bonding temperature (° C.) | 70  70  70 | 70  70  70 | 70  70  70 | 70  70  70 | 70  70  70 | 70  70  70 |
|  | Bake test of laminated glass (the number or sheets with air bubbles/100 sheets) |  | 0  0  1 | 0  1  2 | 1  1  2 | 2  2  4 | 3  4  5 | 4  10  20 |

COMPARATIVE EXAMPLE 4

(Production of the Interlayer for a Laminated Glass)

Except that the routinely extruded non-embossed sheet (polyvinyl butyral resin sheet) was used as the thermoplastic resin sheet, the procedure of Examples was otherwise repeated to give an interlayer for a laminated glass having an embossment pattern on both sides.

The embossment pattern (concave and convex patterns) of the interlayer for a laminated glass as obtained in Comparative Example 4 is shown in Table 4.

It is apparent from Table 4 that the laminated glass sheets manufactured in the above Examples showed fewer sheets with air bubbles (rejects) due to bubbling in the bake test when the deaeration start temperature in preliminary contact bonding by the vacuum deaeration technique was any of 40° C., 50° C., and 60° C. This result indicates that good deaeration was obtained even when the deaeration temperature was not critically controlled or even when preliminary contact bonding was carried out at an ordinary preliminary contact bonding temperature (70° C.) without using a deliberately raised preliminary contact bonding temperature. Furthermore, the interlayers for laminated glass according to Examples 15 and 16 where the Ra of the plateau of the convex portion was less than 2.5 μm showed slightly higher self-adhesiveness than the interlayers for laminated glass according to Examples 12 to 14 but was of the order which does not matter from practical points of view.

On the other hand, the interlayer for a laminated glass having no fine irregularities according to Comparative Example in which the ratio (b/a) of the width of the plateau to the pitch of convex portions was less than 20% showed exceedingly high self-adhesiveness as compared with the interlayer for a laminated glass according to the above Examples and the laminated glass manufactured by using this interlayer for a laminated glass showed many sheets with air bubbles (rejects) owing to bubbling in the bake test as compared with the Examples when the deaeration start temperature in preliminary contact bonding was 50° C. or higher. This result indicates that unless the deaeration start temperature for preliminary contact bonding is strictly controlled to at least below 50° C., the premature marginal sealing of the glass-interlayer assembly takes place so that the air present in the central part of the assembly is not sufficiently removed.

EXAMPLES 17 TO 20 AND COMPARATIVE EXAMPLE 5

For producing various embossment patterns, a variety of embossing rolls were prepared.

A longitudinal pattern-engraving mill (mother mill) was pressed against one metal roll of a pair of embossing rolls and the metal roll and the engraving mill were driven in association to transfer the concave and convex patterns of the engraving mill to the metal roll. Then, the engraving mill was shifted serially in the axial direction of the metal roll in steps of the unit design of the concave and convex patterns to construct an embossing roll carrying an orderly array of longitudinal linear patterns. Further, in Example 19 and Example 20, a transverse pattern-engraving mill was used to transfer the transverse design to said metal roll under a load corresponding to 1/10 of the transfer pressure of said longitudinal-pattern engraving mill. In this procedure, the arrangement and size of the respective patterns were monitored under the microscope.

As the thermoplastic resin sheet, "DXN film" (polyvinyl butyral resin sheet, product of Sekisui Chemical) was used.

The above embossing roll was paired with a rubber roll and with the embossing roll controlled at 130° C., the above thermosetting resin sheet was passed over the roll set to apply the predetermined emboss pattern.

Figure 14:
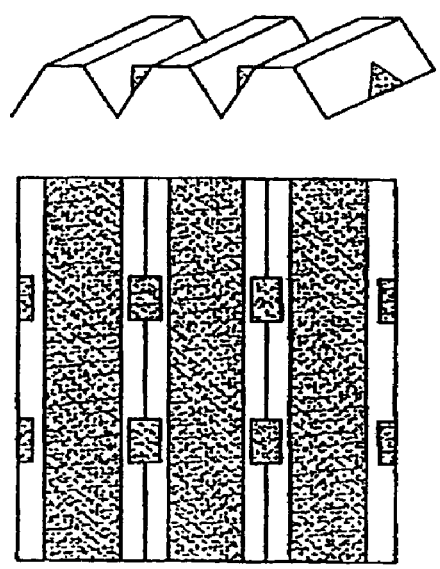
FIG. 14 is a schematic diagram illustrating the embossment pattern (concave and convex patterns) of the interlayers for laminated glass which are obtained in Examples 17 and 18.
Figure 15:
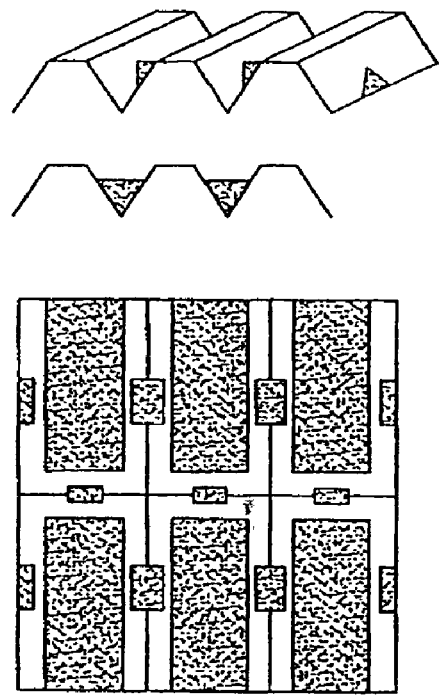
FIG. 15 is a schematic diagram illustrating the embossment pattern (concave and convex patterns) of the interlayers for laminated glass which are obtained in Examples 19 and 20.
Figure 16:
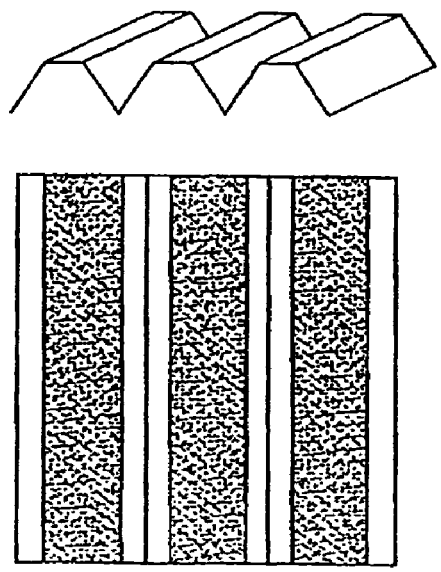
FIG. 16 is a schematic diagram illustrating the embossment pattern (concave and convex patterns) of the interlayer for a laminated glass which is obtained in Comparative Example 5.

The embossed pattern formed on the interlayers for laminated glass as obtained in Example 17 and Example 18 is illustrated in FIG. 14; the embossed pattern formed on the interlayers for laminated glass as obtained in Example 19 and Example 20 is illustrated in FIG. 15; and the embossed pattern formed on the interlayer for a laminated glass as obtained in Comparative Example 5 is illustrated in FIG. 16. The pitch of convex portions, depth of troughs, pitch of segmenting walls, and height of the segmenting wall of each embossment are shown in Table 5.

For each of the 5 kinds of interlayers obtained in Examples 17 to 20 and Comparative Example 5, the average surface roughness (Rz) of the embossment was measured by the same method as used in Example 1. The results are shown in Table 5.

Moreover, using each of the above 5 kinds of interlayers, preliminary contact bonding by the vacuum deaeration technique and final contact bonding were serially performed as described below to manufacture 5 kinds of laminated glass sheets.

[Vacuum Deaeration Method]

The interlayer was sandwiched between two transparent sheets of transparent float glass (30 cm long×30 cm wide×3 mm thick) and the superfluous part was trimmed off. The resulting glass-interlayer assembly was transferred into a rubber bag and the rubber bag was connected to a vacuum suction system. The bag was heated externally under a negative pressure of −60 kPa (absolute pressure 16 kPa) for 10 minutes, whereby the temperature of the glass-interlayer assembly (preliminary contact bonding temperature) was brought to a predetermined temperature. The negative pressure was then returned to atmospheric pressure to complete preliminary contact bonding. The deaeration start temperature for the above preliminary contact bonding was set to 50° C. And the preliminary contact bonding temperature was set to one of the three levels, 60° C., 65° C., or 70° C.

(Final Contact Bonding)

The glass-interlayer assembly provisionally bonded by the above procedure was placed in an autoclave and held at a temperature of 140° C. And a pressure of 1300 kPa for 10 minutes. Then, the temperature was lowered to 50° C. And the pressure was returned to atmospheric-pressure to complete final contact bonding and thereby provide a laminated glass.

The resulting 5 kinds of laminated glass sheets were respectively subjected to a bake test according to the same protocol as used in Example 1 to evaluate the deaeration performance in preliminary contact bonding. The results are shown in Table 5.

TABLE 5

|  |  |  | Example |  |  |  | Compar. Ex. |
|---|---|---|---|---|---|---|---|
|  |  |  | 17 | 18 | 19 | 20 | 5 |
| Embossment of interlayer | Embossment design |  | Linear | Linear | Grid | Grid | Linear |
|  | Embossment arrangement |  | Orderly | Orderly | Orderly | Orderly | Orderly |
|  | Embossment geometry | Pitch of convex portions (μm) | 350 | 500 | 350 | 500 | 350 |
|  |  | Depth of concave portions (μm) | 50 | 50 | 50 | 50 | 50 |
|  |  | Pitch of segmenting walls (μm) | 500 | 500 | 1000 | 1000 | — |
|  |  | Height of segmenting walls (μm) | 25 | 25 | 25 | 25 | — |
|  |  | Average surface roughness (Rz: μm) | 45.5 | 43.6 | 44.5 | 42.7 | 44.2 |
| Results of evaluation deaeration | Condtions of vacuum | Initial vacuum temperature (° C.) | 50 | 50 | 50 | 50 | 50 |
|  |  | Preliminary contact bonding temperature (° C.) | 60  65  70 | 60  65  70 | 60  65  70 | 60  65  70 | 60  65  70 |
|  | Bake test of laminated glass (the number of sheets with air bubbles/100 sheets) |  | 5  4  1 | 2  2  1 | 4  3  2 | 5  3  2 | 30  15  5 |

EXAMPLE 21

The surface of a metal roll was machined with an engraving mill (a linear triangular oblique line cup mill) to form concave and convex patterns (orderly) comprising a multiplicity of concave troughs (linear) triangular in section and the corresponding multiplicity of convex ridges (linear). Further, using glass beads (#46), the roll was blasted from a distance of about 30 cm at an air pressure of 100 kPa to fabricate an embossing roll.

On the other hand, 100 parts by weight of polyvinyl butyral resin (average degree of polymerization 1700, residual acetyl group 1 mol %, butyralization degree 65 mol %) was blended with 40 parts by weight of the plasticizer triethylene glycol di-2-ethylbutyrate and 0.2 part by weight of the bond strength modulator magnesium acetate, and using an extruder, the resulting mixture was melt-kneaded and extruded from a die in a sheet form to give a 0.76 mm-thick polyvinyl butyral sheet.

Using a pair of embossing rolls fabricated in the above manner and the above polyvinyl butyral sheet, an interlayer was produced by the conventional method, which interlayer consisted of a polyvinyl butyral sheet and, as formed on both sides thereof, concave and convex patterns (orderly) comprising a multiplicity of convex ridges (linear) triangular in cross-section and the corresponding multiplicity of convex troughs (linear), said troughs being not on the same level. The water content of this interlayer was adjusted to 0.4 to 0.5 weight %.

EXAMPLE 22

The surface of a metal roll was machined with an engraving mill (pyramid cup mill) to form a multiplicity of concave portions each in the form of a quadrangular pyramid and the corresponding multiplicity of convex portions. The roll was further blasted with glass beads (#20) from a distance of about 30 cm at an air pressure of 100 kPa to fabricate an embossing roll.

Except that a pair of embossing rolls fabricated as above was used, the procedure of Example 21 was otherwise repeated to manufacture an interlayer comprising a polyvinyl butyral sheet and, as formed on both sides thereof, concave and convex patterns (orderly) comprising a multiplicity of convex portions each in the form of a quadrangular pyramid and the corresponding multiplicity of concave portions, with the respective concave portions being not on the same level. In this example, the concave portion between adjacent convex portions constituted a grid-like trough.

EXAMPLE 23

The surface of a metal roll was machined with an engraving mill (wavy triangular oblique line cup mill) to form concave and convex patterns (not orderly) comprising a multiplicity of concave troughs (wavy) triangular in cross-section and the corresponding multiplicity of complementary convex ridges (wavy). The roll was further blasted with glass beads (#20) from a distance of about 30 cm at an air pressure of 1 kg to fabricate an embossing roll.

Except that a pair of embossing rolls fabricated in the above manner was used, the procedure of Example 21 was otherwise repeated to produce an interlayer comprising a polyvinyl butyral sheet and, as formed on both sides thereof, concave and convex patterns (not orderly) comprising a multiplicity of convex ridges (wavy) triangular in cross-section and the corresponding multiplicity of complementary concave troughs (wavy), with the respective troughs being not on the same level.

COMPARATIVE EXAMPLE 6

The surface of a metal roll was machined with an engraving mill (linear triangular oblique line cup mill) to form concave and convex patterns (orderly) comprising a multiplicity of concave troughs (linear) triangular in cross-section and the corresponding multiplicity of complementary convex ridges (linear) to thereby fabricate an embossing roll.

Except that the above embossing roll was used, the procedure of Example 21 was otherwise repeated to produce an interlayer comprising a polyvinyl butyral sheet and, as formed on both sides thereof, concave and convex patterns (orderly) comprising a multiplicity of convex ridges (linear) triangular in cross-section and the corresponding multiplicity of complementary concave troughs (linear), with the respective concave troughs being consistently on the same level.

For each of the interlayers obtained in the above Examples and Comparative Example, the surface roughness (Rz) of the emboss design was measured by the same method as used in Example 1 and the Rzv of the negative model of the embossment was measured by the method described below. Moreover, using these interlayers, laminated glass sheets were manufactured by the following method and subjected to the same bake test as in Example 1 to evaluate deaeration and sealing performances in the preliminary contact bonding stage. The results are collectively shown in Table 6.

[Measurement of Rzv]

Using the general-purpose molding silicone RTV KE-20 (product of Shin-Etsu Chemical), the emboss negative model was taken from each of the above interlayers and the surface roughness Rzv of this negative model was measured using the wedge-shaped tracer (tip width 1000 μm, opposite face angle 90°) by scanning with the tracer shifted in the direction normal to its tip width in accordance with JIS B 0601.

[Evaluation of Deaeration and Sealing Performances]

Preliminary contact bonding was performed by the following alternative techniques (draw deaeration and vacuum deaeration) and final contact drawing was then performed to manufacture laminated glass sheets.

(a) Draw Deaeration Method

The interlayer was sandwiched between two sheets of transparent float glass (30 cm long×30 cm wide×2 mm thick; the margin of each glass sheet was curved by 1 mm with respect to the center) and the superfluous part of the interlayer was trimmed off. The resulting glass-interlayer assembly was heated in an oven until the temperature of the assembly (preliminary contact bonding temperature) had reached 60° C., 70° C. or 80° C. And, then, passed over a pair of nip rollers (air cylinder pressure 350 kPa, linear velocity 10 m/min) for preliminary contact bonding.

(b) Vacuum Dearation

The interlayer was sandwiched between two sheets of transparent float glass (30 cm long×30 cm wide×2 mm thick; the margin of each panel is curved by 1 mm with respect of the center) and the superfluous part of the interlayer was trimmed off. The resulting glass-interlayer assembly was transferred into a rubber bag and the rubber bag was connected to a vacuum suction system. It was then heated externally and held at a negative pressure of −60 kPa (absolute pressure 16 kPa) for 10 minutes, the heating being carried out until the temperature of the assembly (preliminary contact bonding temperature) reached 60° C., 80° C. or 100° C. Then, the pressure was returned to atmospheric pressure to complete preliminary contact bonding.

The assemblies obtained by the above techniques (a) and (b) were respectively held in an autoclave at a temperature of 140° C. And a pressure of 1.3 MPa for 10 minutes, after which the temperature was lowered to 50° C. And the pressure returned to atmospheric pressure for final contact bonding to give laminated glass.

TABLE 6

|  | Example 21 | | | Example 22 | | | Example 23 | | | Compar. Ex. 6 | | |
| --- | --- | --- | --- | --- | --- | --- | --- | --- | --- | --- | --- | --- |
| Configuration of convex portion | Triangular | | | Quadrangular | | | Triangular | | | Triangular | | |
| Configuration of troughs | Linear | | | Grid | | | Wavy | | | Linear | | |
| Arrangement | Orderly | | | Orderly | | | Not orderly | | | Orderly | | |
| Surface roughness of embossment, Rz (μm) | 48.5 | | | 46.4 | | | 52.1 | | | 53.4 | | |
| Surface roughness of negative model, Rzv (μm) | 12.2 | | | 12.9 | | | 13.6 | | | 9.5 | | |
| Rzv/Rz | 0.252 | | | 0.278 | | | 0.261 | | | 0.178 | | |
| Preliminary contact bonding temperature (° C.) | 60 | 70 | 80 | 60 | 70 | 80 | 60 | 70 | 80 | 60 | 70 | 80 |
| Draw roll method | 60 | 70 | 80 | 60 | 70 | 80 | 60 | 70 | 80 | 60 | 70 | 80 |
| Vacuum bag method | 60 | 80 | 100 | 60 | 80 | 100 | 60 | 80 | 100 | 60 | 80 | 100 |
| Bake test of laminated glass (the number of sheets with air bubbles/100 sheets) | | | | | | | | | | | | |
| Draw roll method | 4 | 2 | 0 | 5 | 2 | 0 | 5 | 2 | 0 | 45 | 22 | 0 |
| Vacuum bag method | 3 | 1 | 0 | 2 | 2 | 0 | 4 | 1 | 0 | 15 | 6 | 0 |

As the thermoplastic resin sheet, DX film (product of Sekisui Chemical) was used.

Using a pair of rolls, namely a metal roll machined with a triangular oblique line mill (75 mesh, 80 depth, manufactured by Yuri Roll Co.) And a rubber roll having a JIS hardness of 45 to 75, as the surface irregularity transfer device, the DX film was passed through the surface irregularity transfer device to form a trough-shaped embossment pattern of continual concave portions on one side of the DX film. The transfer conditions were as follows.
Temperature of DX film: room temperature
Roll temperature: 140° C.
Linear velocity: 10 m/min.
Press linear pressure: 2500 kPa Then, using a pair of rolls, namely a metal roll machined with said triangular oblique line mill and a reverse triangular oblique line mill (75 mesh, 80 depth, manufactured by Yuri Roll Co.), and a rubber roll having a JIS hardness of 45 to 75, as the surface irregularity transfer device, the above-mentioned DX film formed with a trough pattern on one side was passed through this surface irregularity transfer device to apply a grid-form segmenting pattern to the continual ridge pattern. The transfer conditions used here were as follows.
Temperature of DX film: room temperature
Roll temperature: 110° C.
Linear velocity: 10 m/min.
Press linear pressure: 2000 kPa Then, the other side of the DX film was subjected to the same treatment as above to give an interlayer for a laminated glass having an embossment pattern comprising embossed concave portions with a continual trough-like geometry and embossed convex portions with segmented portions on both sides.

Linear velocity: 10 m/min.
Press linear pressure: 2000 kPa

EXAMPLE 25

Except that the transfer conditions for applying a grid-form segmenting pattern to the continual embossed convex portions were altered to those mentioned below, the procedure of Example 24 was otherwise repeated to give an interlayer for a laminated glass having an embossment pattern comprising embossed concave portions with continual trough-like geometry and embossed convex portions with segmented portions on both sides.
Temperature of DX film: room temperature
Roll temperature: 120° C.
Linear velocity: 10 m/min.
Press linear pressure: 2000 kPa

EXAMPLE 26

Except that the following conditions (1) were used in the transfer operation for applying an embossment comprising continual trough-like geometry of concave portions and the following conditions (2) in the transfer operation for applying a grid-like segmenting pattern to the continual convex portion of the embossment, the procedure of Example 24 was otherwise repeated to give an interlayer for a laminated glass having an embossment comprising embossed concave portions with continual trough-like geometry and embossed convex portions with segmented portions on both sides.

Condition (1)
Temperature of DX film: room temperature
Roll temperature: 120° C.
Linear velocity: 10 m/min.
Press linear pressure: 2500 kPa Condition (2)
Temperature of DX film: room temperature
Roll temperature: 130° C.
Linear velocity: 10 m/min.
Press linear pressure: 2000 kPa

COMPARATIVE EXAMPLE 7

Except that the grid-form segmenting pattern was not applied to the continual convex portion of the embossment, the procedure of Example 24 was otherwise repeated to give an interlayer for a laminated glass having an embossment comprising embossed concave portion with a continual trough-like geometry and embossed convex portions without segmented portions on both sides.

The characteristics [(1) average surface roughness (Rz), (2) slip test, (3) antiblocking properties, (4) bake test] of the four kinds of interlayers for laminated glass as obtained in Examples 24 to 26 and Comparative Example 7 were evaluated by the following methods. The results are shown in Table 7.

(1) Average Surface Roughness (Rz)

This parameter was measured in the same manner as in Example 1.

(2) Slip Test

The interlayer cut to 50 cm×50 cm was placed in horizontal position on a smooth-surfaced glass plate (50 cm long×50 cm wide) and a slip glass sheet (10 cm long×10 cm wide×2.5 mm thick) was placed in superposition. After 30 seconds, the slip glass sheet was pulled horizontally with a spring balance and the maximum frictional resistance was determined from the spring scale reading. The measurement was made in 5 replicates and the average value was taken as maximum frictional resistance (g). The measurement was performed in an atmosphere of 20° C., 40% RH. The smaller the maximum frictional resistance value is, the superior is the slippage between the glass sheet and the interlayer, which means that the relative positioning of the glass sheet and the interlayer is facilitated in the laminating operation and hence the handling workability is improved.

(3) Antiblocking Properties

Two sheets of the interlayer cut to 15 cm×15 cm were set one on the other and a weight of 13 kg was put on the sheets. After 24 hours of standing at room temperature, an angular peel test was performed using a tensile tester at a pulling speed of 500 mm/min to measure the peel strength. The measurement was carried out in 5 replicates and the average result was taken as peel strength (g). The smaller this peel strength value is, the less ready is the sheet-to-sheet self-adhesion of the interlayer, which means superior antiblocking properties and better workability in storage and in the operation for interposing the interlayer between glass sheets.

(4) Bake Test

Preliminary contact bonding was performed by the two alternative techniques, viz. (a) draw deaeration and (b) vacuum deaeration, just as in Example 21, followed by final contact bonding to produce laminated glass sheets and these sheets were subjected to the bake test.

Furthermore, the laminated glass sheets of Examples 24 to 26 as manufactured by using the interlayers according to Examples 24 to 26 showed fewer sheets with air bubbles (fewer rejects) in the bake test, regardless of the preliminary contact bonding temperature used in the draw deaeration process or in the vacuum deaeration process. These results indicate good deaeration and sealing in the preliminary contact bonding stage.

In contrast, the laminated glass of Comparative Example 7 which was manufactured by using the interlayer for a laminated glass according to Comparative Example 7 without providing segmentation to convex portions of the embossment showed many sheets with air bubbles (many rejects) in the bake test when the preliminary contact bonding temperature was low, whether in the draw deaeration process or in the vacuum deaeration process. This means that the sealing in the preliminary contact bonding stage was not wholesome, thus causing insufficient deaeration. Moreover, the result indicates that there are limitations on the manufacturing conditions which can be used in the preliminary contact bonding stage.

EXAMPLE 27

Figures 20A, 20B:
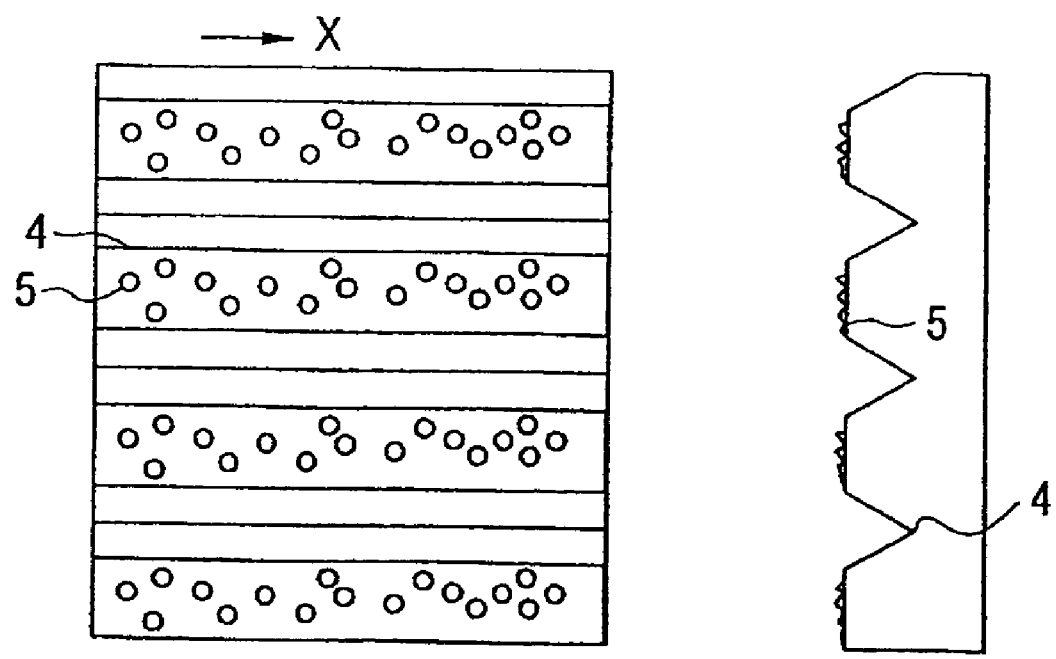
FIG. 20 shows an interlayer for a laminated glass according to the sixth aspect of the invention, where (a) is a plan view and (b) is a side elevation view.

FIG. 20 shows an interlayer embodying the principles of the present invention, where (a) is a plan view and (b) is a side elevation view.

As shown in FIG. 20, the interlayer 1 of the invention comprises an extrusion-molded thermoplastic resin sheet provided with a plurality of embossments 3 comprising fine concave portions and convex portions (not shown) on both sides and concave troughs 2 on one side, said concave troughs 2 being disposed generally in parallel with the direction of extrusion X of the thermoplastic resin sheet.

(Production of an Interlayer)

A thermoplastic resin sheet as obtained by extrusion of plasticized polyvinyl butyral resin (product of Sekisui Chemical; trade name "S-Rec Film DXN", 760 μm thick) was passed through a surface irregularity transfer device comprising a pair of rolls, namely a metal roll formed with prismatic ridges (height: 120 μm, base 150 μm, pitch: 300 μm) complementary with the concave troughs 2 illustrated in FIG. 20 in axial continuum and random concave and convex patterns in the regions other than said ridges, and a rubber

TABLE 7

| | | | | Example 24 | | | Example 25 | | | Example 26 | | | Compar. Ex. 7 | | |
|---|---|---|---|---|---|---|---|---|---|---|---|---|---|---|---|
| Embossment of interlayer | Concave portion | Geometry | | Grid of troughs | | | Grid of troughs | | | Grid of troughs | | | Linear troughs | | |
| | | Arrangement | | Orderly | | | Orderly | | | Orderly | | | Orderly | | |
| | Convex portion | Segmentation | | Segmented | | | Segmented | | | Segmented | | | Not segmented | | |
| | | Depth of segmenting trough | | Shallow | | | Slightly deep | | | Deep | | | — | | |
| Performance characteristics of interlayer | Average surface roughness (Rz: μm) | | | 38.2 | | | 42.2 | | | 46.1 | | | 56.5 | | |
| | Slip properties (max. frictional resistance: g) | | | 265 | | | 255 | | | 225 | | | 302 | | |
| | Antiblocking properties (peel strength: g) | | | 420 | | | 415 | | | 380 | | | 440 | | |
| | Bake test | Preliminary contact bonding temperature (° C.) | Draw deaeration | 60 | 70 | 80 | 60 | 70 | 80 | 60 | 70 | 80 | 60 | 70 | 80 |
| | | | Vacuum deaeration | 60 | 80 | 100 | 60 | 80 | 100 | 60 | 80 | 100 | 60 | 80 | 100 |
| | | the number of sheets with air bubbles/100 sheets | Draw deaeration | 2 | 1 | 0 | 4 | 1 | 0 | 6 | 2 | 0 | 20 | 10 | 0 |
| | | | Vacuum deaeration | 1 | 0 | 0 | 2 | 1 | 0 | 4 | 3 | 0 | 25 | 15 | 0 |

It will be apparent from Table 7 that the intelayers for laminated glass according to Examples 24 to 26 of the invention invariably have excellent slip and antiblocking properties. This means that these interlayers provide for good workability in handing during storage and glass processing.

roll having a JIS hardness of 45 to 75 with random concave and convex patterns, to fabricate an interlayer having concave troughs 2 each in a continuum parallel to the extrusion direction of the sheet on one side thereof and embossed concave and convex patterns on both sides. The transfer conditions used here were as follows.

Temperature of DX film: room temperature
Roll temperature: 120° C.
Linear velocity: 10 m/min.
Press linear pressure: 500 kPa

COMPARATIVE EXAMPLE 8

Except that the prismatic ridges of the metal roll were disposed at an angle of 45° with the axial direction, the procedure of Example 27 was otherwise repeated to fabricate an interlayer.

COMPARATIVE EXAMPLE 9

Except that the prismatic ridges of the metal roll were disposed in the circumferential direction, the procedure of Example 27 was otherwise repeated to fabricate an interlayer.

COMPARATIVE EXAMPLE 10

Except that V-shaped concave troughs were provided in the circumferential direction in lieu of the prismatic ridges of the metal roll, the procedure of Example 27 was otherwise repeated to fabricate an interlayer.

The interlayers obtained in Example 27 and Comparative Examples 8 to 10 were evaluated as follows.

(10-Point Average Surface Roughness {Rz (μm)})

This parameter was measured by the same method as in Example 1.

(Bake Test)

Preliminary contact bonding by the following alternative techniques, (a) draw deaeration and (b) vacuum deaeration, and final contact bonding were serially carried out to manufacture laminated glass sheets.

(a) Draw Deaeration

The interlayer was sandwiched between two sheets of transparent float glass (30 cm long×30 cm wide×2 mm thick; glass sheets with the margin curved by 1 mm with respect to the center) and the superfluous part was trimmed off. The resulting assembly was heated in an oven until the temperature of the assembly had reached 70° C., 80° C. or 90° C. And, then, passed over a nip roll (air cylinder pressure 35.5 MPa, linear velocity 10 m/min) for preliminary contact bonding.

(b) Vacuum Deaeration

The interlayer was sandwiched between two sheets transparent float glass (30 cm long×30 cm wide×2 mm thick; glass sheets with the margin curved by 1 mm with respect to the center) and the superfluous part was trimmed off. The resulting assembly was transferred into a rubber bag and the rubber bag was connected to a vacuum system. The assembly was heated externally under a negative pressure of −60 kPa (absolute pressure 16 kPa) for 10 minutes until the temperature of the assembly (preliminary contact bonding temperature) had reached 70° C., 80° C. or 90° C. The pressure was then returned to atmospheric pressure to complete preliminary contact bonding.

The glass-interlayer assemblies subjected to preliminary contact bonding in the above processes (a) and (b), respectively, were held in an autoclave at a temperature of 140° C. And a pressure of 1.3 MPa for 10 minutes, after which the temperature was lowered to 50° C. And the pressure returned to atmospheric pressure to complete final contact bonding to give laminated glass.

The laminated glass sheets obtained as above were subjected to the bake test under the same conditions as in Example 1.

TABLE 8

|  |  |  |  | Example | Compar. Ex. | | |
|---|---|---|---|---|---|---|---|
|  |  |  |  | 27 | 8 | 9 | 10 |
| 10-point average surface roughness (μm) | | | | 35.5 | 37.8 | 40.2 | 64.2 |
| Bake test the number of sheets with air bubbles/100 sheets | Draw deaeration | Temperature | 70° C. | 1 | 4 | 3 | 14 |
| | | | 80° C. | 1 | 2 | 4 | 8 |
| | | | 90° C. | 0 | 1 | 2 | 11 |
| | Vacuum deaeration | Temperature | 70° C. | 0 | 0 | 1 | 1 |
| | | | 80° C. | 0 | 1 | 0 | 2 |
| | | | 90° C. | 1 | 0 | 1 | 0 |

EXAMPLE 28

The surface of a metal roll, blasted with #36 alumina to a surface roughness of about 60 μm, was coated with a lubricant and a geometric transfer was made to the surface of a substrate interlayer sheet at 100° C. to give an interlayer having a random emboss pattern with a surface roughness of 30 μm. The surface of another metal roll was impressed with a triangular mill to form 200 μm-deep troughs on the surface of the metal roll and further impressed with a perpendicular triangular mill to prepare a roll surface reduced by 15 μm in depth of the troughs (corresponding to the bottom surface in the interlayer). Then, this roll surface was geometrically transferred to the surface of the interlayer having said random embossment to give an interlayer having 40 μm-deep, 80 μm-wide troughs at a pitch of 500 μm within 55 μm-deep, 60 μm-wide troughs formed at a trough pitch of 300 μm

EXAMPLE 29

Except that the pressure used for the geometric transfer of the metal roll surface to the substrate interlayer surface was altered, the procedure of Example 28 was otherwise repeated to give an interlayer having a random embossment with a roughness of 30 μm as well as 50 μm-deep, 70 μm-wide troughs formed at a pitch of 500 μm within 55 μm-deep, 60 μm-wide troughs.

COMPARATIVE EXAMPLE 11

The pressure used for the geometric transfer of the metal roll surface to the substrate interlayer surface was altered and the troughs were not formed, the procedure of Example 28 was repeated to give an interlayer having a random-embossment with a surface roughness of 55 μm.

COMPARATIVE EXAMPLE 12

Except that the troughs were not formed, the procedure of Example 28 was otherwise repeated to give an interlayer having a random embossment with a surface roughness of 30 μm.

COMPARATIVE EXAMPLE 13

A metal roll was machined to form the embossing pattern consisting of a uniform array of quadrangular pyramids and the surface of this metal roll was geometrically transferred to a substrate interlayer sheet surface to give an interlayer with a surface roughness of 70 μm.

COMPARATIVE EXAMPLE 14

Except that the pressure used for the geometric transfer of the metal roll surface to the interlayer sheet surface was altered, the procedure of Comparative Example 13 was otherwise repeated to give an interlayer with a surface roughness of 35

COMPARATIVE EXAMPLE 15

The procedure of Example 28 was repeated to give an interlayer having a random emboss pattern with a surface roughness of 30μm. Then, an iron roll surface with ridge-shaped troughs was constructed and a geometric transfer was carried out from this roll surface to the interlayer surface having the above random embossment to give an interlayer having 55 μm-deep, 60 μm-wide triangular wavy troughs at a pitch of 300 μm.

The performances (deaeration characteristics) of the interlayers obtained in the above Examples and Comparative Examples were evaluated by the following method. The results are shown in Table 9.

(Evaluation of Deaeration Characteristic)

Each interlayer was sandwiched between two transparent 2 mm-thick glass sheets and the resulting glass-interlayer assembly was put in a rubber bag set to the initial temperature indicated in Table 9. The rubber bag was connected to a vacuum suction system and the evacuation was started. The reduced pressure was maintained for about 10 minutes and the assembly was heated to the ultimate temperature indicated in Table 9. After cooling, the laminated glass was taken out and examined for air bubbles. The case in which no air bubble was found was rate O and the case in which air bubbles were observed was rated X.

according to Examples of the invention, the evacuation initial temperature can be set high and the ultimate temperature can be set low, so that an improved deaeration efficiency can be obtained in preliminary contact bonding.

INDUSTRIAL APPLICABILITY

Because the present invention is constituted as described above, there is no moiré phenomenon even when the arrangement and pitch of the embossment are orderly so that there can be provided an interlayer for a laminated glass with good workability in cutting and laminating operations and excellent deaeration characteristic in preliminary contact bonding.

Furthermore, because of the above constitution of the invention, the trouble of premature marginal sealing does not take place even if the deaeration initial temperature in preliminary contact bonding is not critically controlled so that an interlayer for a laminated glass with an excellent deaeration effect can be provided. Moreover, since the self-adhesion of the interlayer can be controlled, the interlayer has good handling characteristics.

Because of the very constitution described above, the invention provides an interlayer for a laminated glass which is not only good in workability in terms of blocking resistance during storage and handling in laminating work but also excellent in the deaeration and sealing characteristics in preliminary contact bonding. Therefore, particularly in the manufacture of large-area or large-radius-of-curvature laminated glass or for increased productivity of laminated glass production, both deaeration and sealing between the glass and interlayer are sufficiently effected so that the trouble of formation of air bubbles between the glass and interlayer due to infiltration of pressurized air through the sealing defect in the final contact bonding under heating and pressure in an autoclave and the consequent incidence of rejects can be largely obviated, thus laminated glass products with particularly high transparency can be obtained.

As a further advantage of the interlayer for a laminated glass according to the invention, satisfactory deaeration and sealing can be obtained in preliminary contact bonding over a broad temperature range so that the control of preliminary contact bonding temperature is facilitated and the workability in laminating work is remarkably improved, with the result that a variety of processing requirements of various users can be satisfied with ease and good efficiency.

Therefore, with the interlayer for a laminated glass according to the invention, not only good workability is

TABLE 9

| | | Deaeration characteristic (inclusion of air bubbles) | | | | | | | | | | | | |
|---|---|---|---|---|---|---|---|---|---|---|---|---|---|---|
| | | Initial temperature (° C.) | | | | | | Ultimate temperature (° C.) | | | | | | |
| | | 20 | 25 | 30 | 35 | 40 | 45 | 50 | 70 | 75 | 80 | 85 | 90 | 95 | 100 |
| Example | 28 | O | O | O | O | O | O | X | X | X | X | X | O | O | O |
| | 29 | O | O | O | O | O | O | X | X | X | X | X | X | O | O |
| Compar. Ex. | 11 | O | O | O | O | X | X | X | X | X | X | X | O | O | O |
| | 12 | O | X | X | X | X | X | X | X | O | O | O | O | O | O |
| | 13 | O | O | O | X | X | X | X | X | X | X | O | O | O | O |
| | 14 | O | O | X | X | X | X | X | X | O | O | O | O | O | O |
| | 15 | O | O | O | O | O | O | X | X | X | X | X | X | X | O |

O: No air bubble
X: Air bubbles insured in the manufacture of laminated glass products but there can be obtained laminated glass of high quality substantially no incidence of rejects due to formation of air bubbles even under stringently restricted manufacturing conditions.

The laminated glass products manufactured by using the interlayer for a laminated glass according to the invention is of high quality almost free of the air bubble problem even when manufactured under rigorously restricted conditions and can be used with advantage in the glazing of the windows of cars, rolling stock, aircraft, buildings and so forth.

The invention claimed is:

1. An interlayer for a laminated glass
   which comprises a thermoplastic resin sheet provided with embossments comprising concave portions and convex portions on both sides thereof,
   said concave portions on at least one side having a trough-like geometry, and
   segmenting walls being formed in said trough-like geometry, thereby obviating an occurrence of a seal defect,
   wherein the thermoplastic resin sheet is a plasticized polyvinyl acetal resin sheet.

2. The interlayer for a laminated glass according to claim 1, wherein a height of the segmenting wall is smaller than a depth of the trough.

3. The interlayer for a laminated glass according to claim 2, wherein the segmenting walls are arranged at equal intervals.

4. The interlayer for a laminated glass according to claim 1,
   wherein the trough-like geometry is constant in sectional area while the segmenting wall has a depth distribution of troughs having a depth of not less than 5% of the maximum trough depth.

5. The interlayer for a laminated glass according to claim 4,
   wherein troughs having the depth of not less than 5% of the maximum trough depth are provided at a pitch of not more than 10 mm.

6. The interlayer for a laminated glass according to claim 4,
   wherein the trough-like geometry is provided in parallel with the direction of flow of the interlayer for a laminated glass.

7. A laminated glass obtainable by interposing the interlayer for the laminated glass according to claim 1 between at least one pair of glass sheets and consolidating them into an integral unit.

* * * * *